US012625973B1

(12) United States Patent
Drew et al.

(10) Patent No.: US 12,625,973 B1
(45) Date of Patent: *May 12, 2026

(54) CPE PREDICTION USING BANNER-PROMPTED LLM

(71) Applicant: CrowdStrike, Inc., Sunnyvale, CA (US)

(72) Inventors: Shaefer Drew, Redmond, OR (US); Michael Avraham Brautbar, Groton, MA (US)

(73) Assignee: CrowdStrike, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/049,283

(22) Filed: Feb. 10, 2025

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 9,569,201 B1 * | 2/2017 | Lotem | ...................... G06F 8/70 |
| 11,178,223 B2 | 11/2021 | Morin | |
| 11,507,860 B1 | 11/2022 | Hodgman | |
| 11,895,372 B1 | 2/2024 | Sanghavi | |
| 12,028,368 B1 | 7/2024 | Cohen | |
| 12,126,643 B1 * | 10/2024 | Skarphedinsson | .... G06F 16/906 |
| 2018/0129810 A1 * | 5/2018 | Kim | ................. G06F 16/90344 |
| 2022/0141247 A1 | 5/2022 | Shakarian | |
| 2022/0215100 A1 | 7/2022 | Waplington | |
| 2023/0034866 A1 * | 2/2023 | Hodgman | ............. H04L 69/164 |
| 2023/0205892 A1 * | 6/2023 | Wareus | ................. G06F 21/577 |
| | | | 726/25 |
| 2024/0427879 A1 * | 12/2024 | Bulut | .................... G06F 21/554 |
| 2025/0080579 A1 * | 3/2025 | Mushtaq | ............. H04L 63/1483 |
| 2025/0124475 A1 * | 4/2025 | Carlson | ............. G06Q 30/0282 |

(Continued)

FOREIGN PATENT DOCUMENTS

| | | |
|---|---|---|
| CN | 110213212 | 9/2019 |
| CN | 110708292 | 1/2020 |

(Continued)

OTHER PUBLICATIONS

Venkat Pothamsetty, "How to Generate CPE information from Software Using Generative AI", Apr. 9, 2024, https://transilience. freshdesk.com/support/solutions/articles/154000142201. (Year: 2024).*

(Continued)

*Primary Examiner* — Philip J Chea
*Assistant Examiner* — Bin Qing Zheng
(74) *Attorney, Agent, or Firm* — Law Office of Scott P. Zimmerman, PLLC

(57) ABSTRACT

Prediction of CPEs using banners greatly improves computer functioning. Many web services have an unknown common platform enumeration (CPE). When the CPE is unknown, a computer system is unable to obtain cybersecurity flaws and software fixes for a software product or web service. A CPE, though, is predicted by banner-prompting a large language model using a web service banner. Once the CPE is predicted, vulnerabilities may be identified.

20 Claims, 33 Drawing Sheets

(56)                References Cited

U.S. PATENT DOCUMENTS

2025/0158959 A1 *    5/2025    Kang ................. H04L 61/4511
2025/0265418 A1 *    8/2025    Kasuya ................... G06F 40/30

FOREIGN PATENT DOCUMENTS

| | | | | | |
|---|---|---|---|---|---|
| CN | 118364476 B | * | 8/2024 | ........... | G06F 21/577 |
| CN | 119011300 A | | 11/2024 | | |
| CN | 119760712 A | | 4/2025 | | |
| KR | 102079687 | | 2/2020 | | |
| KR | 20200056627 A | * | 5/2020 | ............ | G06F 21/57 |
| KR | 20210091953 | | 7/2021 | | |
| KR | 20230077073 | | 6/2023 | | |
| KR | 20240178195 | | 12/2024 | | |
| WO | WO-2008101289 | | 8/2008 | | |
| WO | WO-2021160822 | | 8/2021 | | |
| WO | WO-2025115162 A1 | * | 6/2025 | ............ | G06N 20/00 |

OTHER PUBLICATIONS

Pothamsetty, Venka, "How to Generate CPE information from Software Using Generative AI," https://transilience.freshdesk.com/support/solutions/articles/154000142201, accessed on or about Nov. 25, 2024.

Wareus, Emil, and Hell, Martin, "Automated CPE Labeling of CVE Summaries with Machine Learning," Springer Nature Switzerland AG 2020, 20 pages.

https://www.aimodels.fyi/papers/arxiv/distalaner-distantly-supervised-active-learning-augmented-named, accessed on or about Nov. 25, 2024.

Banerjee, Somnath et al., "DISTALANER: Distantly Supervised Active Learning Augmented Named Entity Recognition in the Open Source Software Ecosystem," 21 pages.

Hu et al., "CPE-Identifier: Automated CPE identification and CVE summaries annotation with Deep Learning and NLP," experarXiv:2405.13568v1 [cs.CR] May 22, 2024, 12 pages.

Huff, Philip et al., "A Recommender System for Tracking Vulnerabilities," The 16th International Conference on Availability, Reliability and Security (ARES 2021), Aug. 17-20, 2021, Vienna, Austria. ACM, New York, NY, USA, 7 pages. https://doi.org/10.1145/3465481.3470039.

Janovsky, Adam et al., "sec-certs: Examining the security certification practice for better vulnerability mitigation," Masaryk University, Brno, Czechia, arXiv:2311.17603v2 [cs. CR] Jul. 1, 2024, 27 pages.

Mcclanahan, Kylie et al., "Towards Automatically Matching Security Advisories to CPEs: String Similarity-based Vendor Matching," 2024 Workshop on Computing, Networking and Communications (CNC), 6 pages.

Glanz et al., "A Vulnerability's Lifetime: Enhancing Version Information in CVE Database," Proceedings of the 15th International Conference on Knowledge Technologies and Data-driven Business (i-KNOW '15), Oct. 2015. 4 pages.

Sadlek et al., "Current Challenges of Cyber Threat and Vulnerability Identification Using Public Enumerations," ARES 2022, Jun. 29, 2022, Vienna, Austria, 8 pages.

Kim et al., "A Design of Automated Vulnerability Information Management System for Secure Use of Internet-Connected Devices Based on Internet-Wide Scanning Methods," IEICE Trans. Inf. & SYST., vol. E104-D, No. Nov. 11, 2021, 9 pages.

Baek, J. English Translation of KR 20210091953 A. (Year 2021), 10 pages.

Office Action mailed May 14, 2025 for U.S. Appl. No. 19/080,998, filed Mar. 17, 2025, Drew et al., 12 pages.

Notice of Allowance for U.S. Appl. No. 19/080,998, Drew, "CPE Prediction Using Banner-Prompted AI/ML Modeling", mailed Sep. 16, 2025, 9 pages.

\* cited by examiner

FIG. 4

```
cpe:<cpe_version>:<part>:<vendor>:<product>:<version>:<update>:<edition>:<language>:<sw_edition>:<target_sw>:
<target_hw>:<other>
```

| Field | Type | Description | Example |
|---|---|---|---|
| cpeName | str | CPE Name | cpe:2.3:a:apache:http_server:1.0.2:*:*:* |
| vendor | str | vendor name | apache |
| product | str | product name | http_server |
| vendor:product | str | vendor:product combination | apache:http_server |
| vendor_count | int | count of unique vendors for that product name | 1 |

```
root@kali:~# curl -s -I 192.168.0.11
HTTP/1.1 200 OK
Date: Fri. 03 Jul 2020 19:11:08 GMT
Server: Apache/2.4.29 (Ubuntu)
Last-Modified: Sun, 21 Jun 2020 19:07:07 GMT
ETag: "2aa6-5a89cd520737c"
Accept-Ranges: bytes
Content-Length: 10918
Vary: Accept-Encoding
Content-Type: text/html
```

FIG. 9

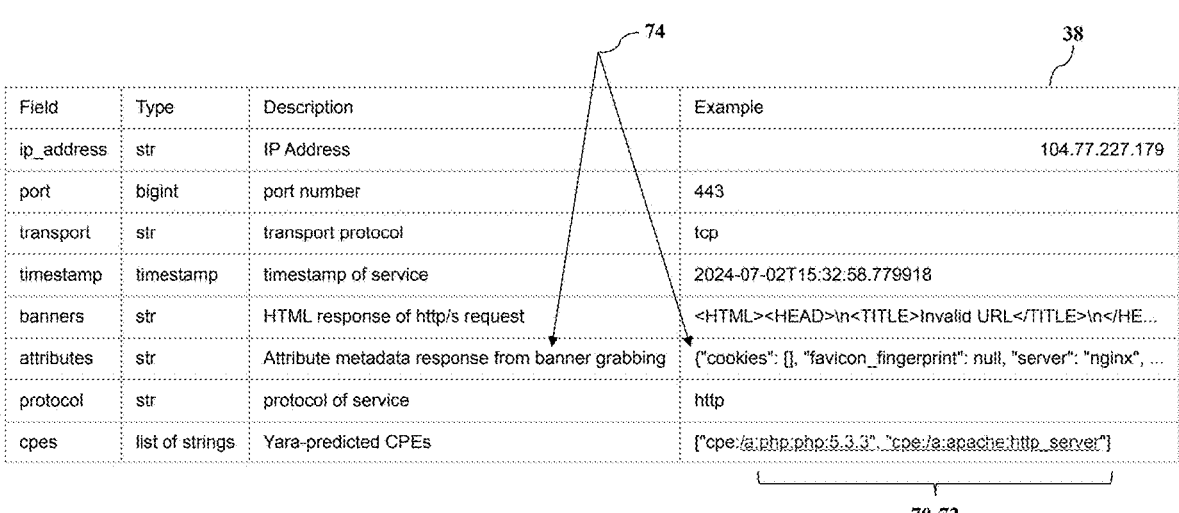

| Field | Type | Description | Example |
|---|---|---|---|
| ip_address | str | IP Address | 104.77.227.179 |
| port | bigint | port number | 443 |
| transport | str | transport protocol | tcp |
| timestamp | timestamp | timestamp of service | 2024-07-02T15:32:58.779918 |
| banners | str | HTML response of http/s request | <HTML><HEAD>\n<TITLE>Invalid URL</TITLE>\n</HE... |
| attributes | str | Attribute metadata response from banner grabbing | {"cookies": [], "favicon_fingerprint": null, "server": "nginx", ... |
| protocol | str | protocol of service | http |
| cpes | list of strings | Yara-predicted CPEs | ["cpe:/a:php:php:5.3.3", "cpe:/a:apache:http_server"] |

FIG. 10

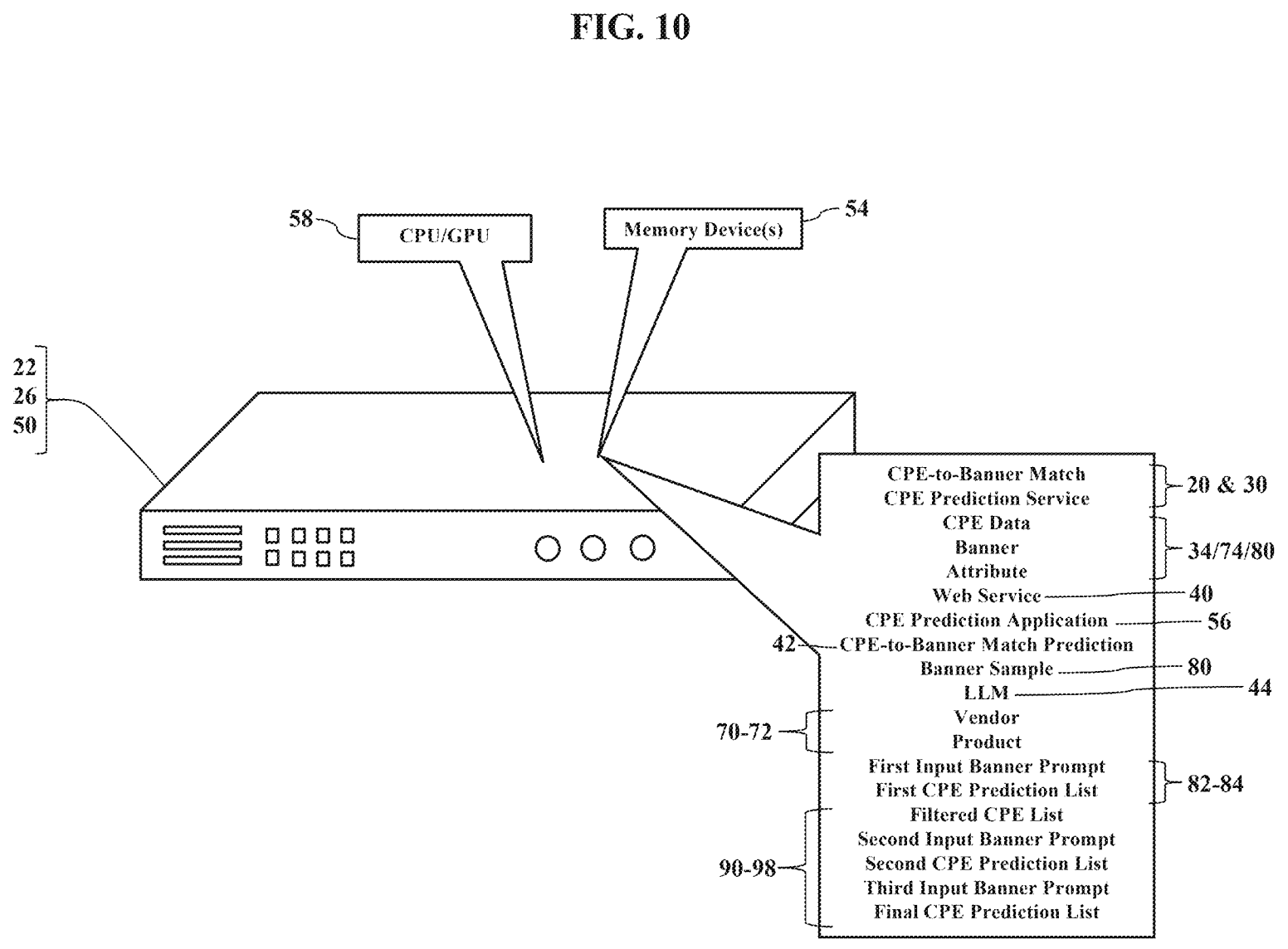

Memory Device(s) — 54

CPU/GPU — 58

22
26
50

42

70-72

90-98

CPE-to-Banner Match
CPE Prediction Service          } 20 & 30
CPE Data
Banner
Attribute          } 34/74/80
Web Service          40
CPE Prediction Application          56
CPE-to-Banner Match Prediction
Banner Sample          80
LLM
Vendor          44
Product First Input Banner Prompt
First CPE Prediction List
Filtered CPE List          } 82-84
Second Input Banner Prompt
Second CPE Prediction List
Third Input Banner Prompt
Final CPE Prediction List

FIG. 11

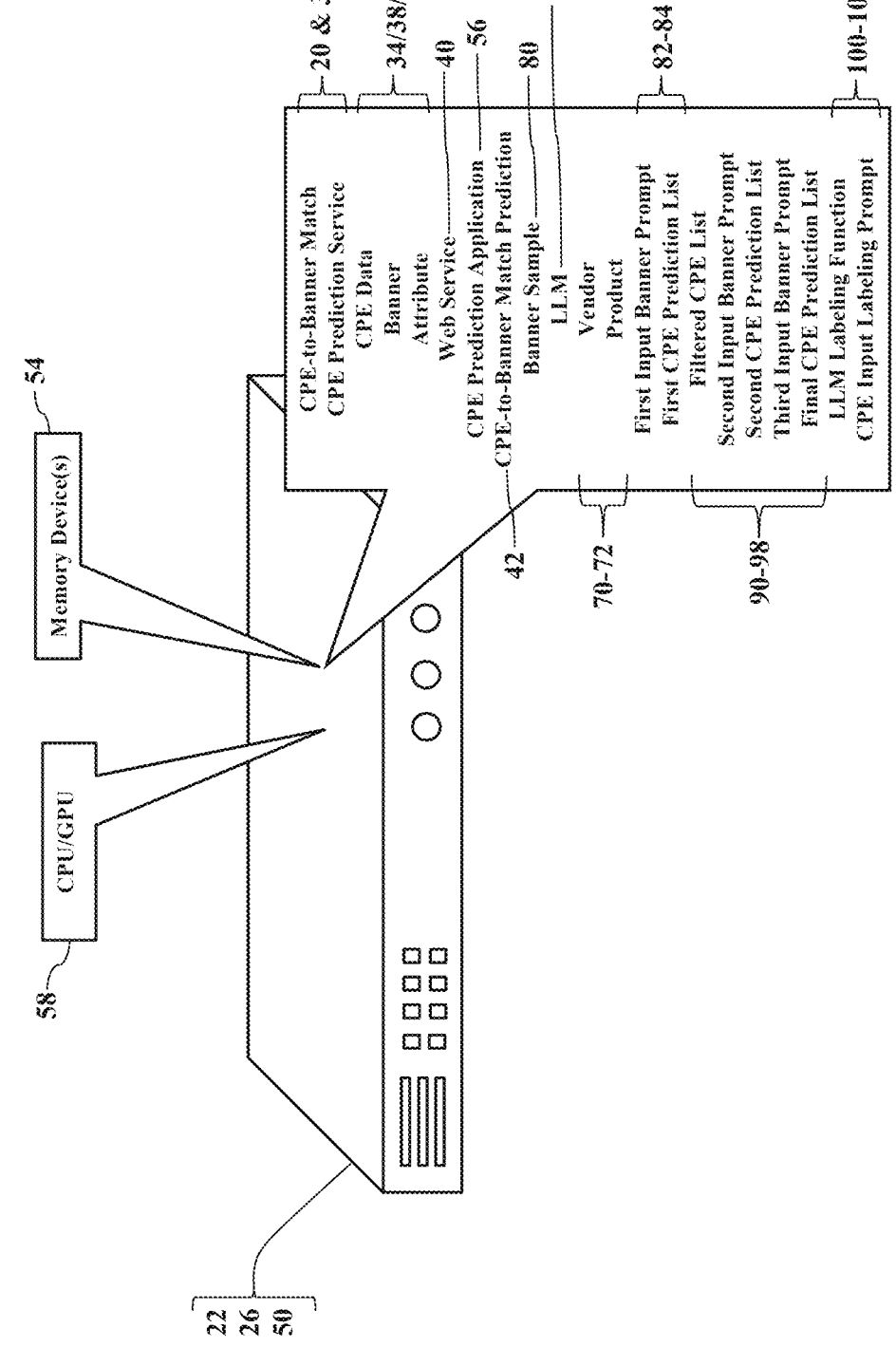

22
26
50

58

CPU/GPU

Memory Device(s)   54

CPE-to-Banner Match
CPE Prediction Service            20 & 30
CPE Data
Banner
Attribute                         34/38/74
Web Service                       40
CPE Prediction Application        56
CPE-to-Banner Match Prediction
Banner Sample                     80
LLM                               44
Vendor
Product
First Input Banner Prompt         82-84
First CPE Prediction List
Filtered CPE List
Second Input Banner Prompt
Second CPE Prediction List
Third Input Banner Prompt
Final CPE Prediction List
LLM Labeling Function
CPE Input Labeling Prompt         100-102

Figure 12:
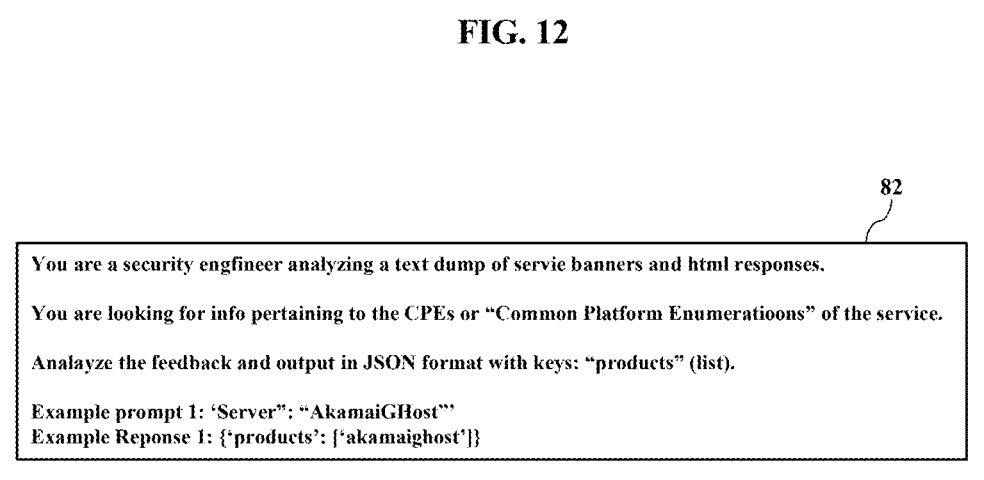

You are a security engfineer analyzing a text dump of servie banners and html responses.

You are looking for info pertaining to the CPEs or "Common Platform Enumeratioons" of the service.

Analayze the feedback and output in JSON format with keys: "products" (list).

Example prompt 1: 'Server": "AkamaiGHost"'
Example Reponse 1: {'products': ['akamaighost']}

Figure 13:
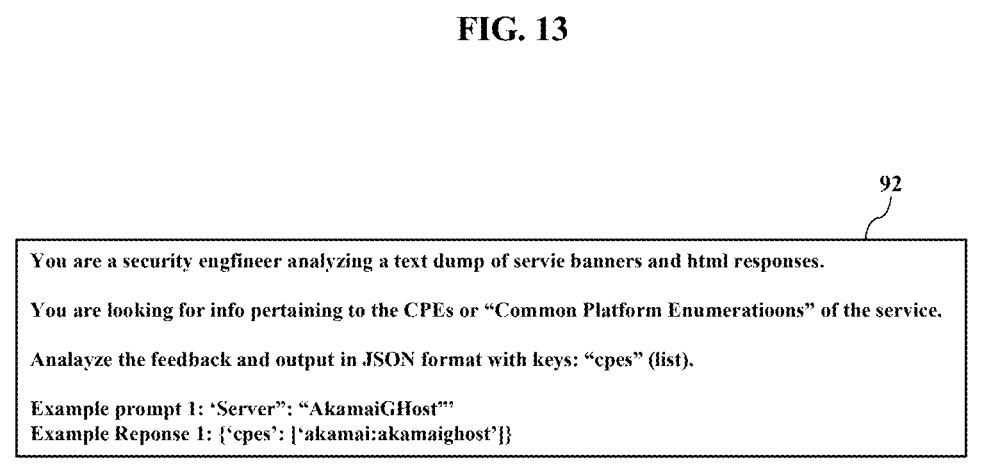

You are a security engfineer analyzing a text dump of servie banners and html responses.

You are looking for info pertaining to the CPEs or "Common Platform Enumeratioons" of the service.

Analayze the feedback and output in JSON format with keys: "cpes" (list).

Example prompt 1: 'Server": "AkamaiGHost"'
Example Reponse 1: {'cpes': ['akamai:akamaighost']}

FIG. 14A

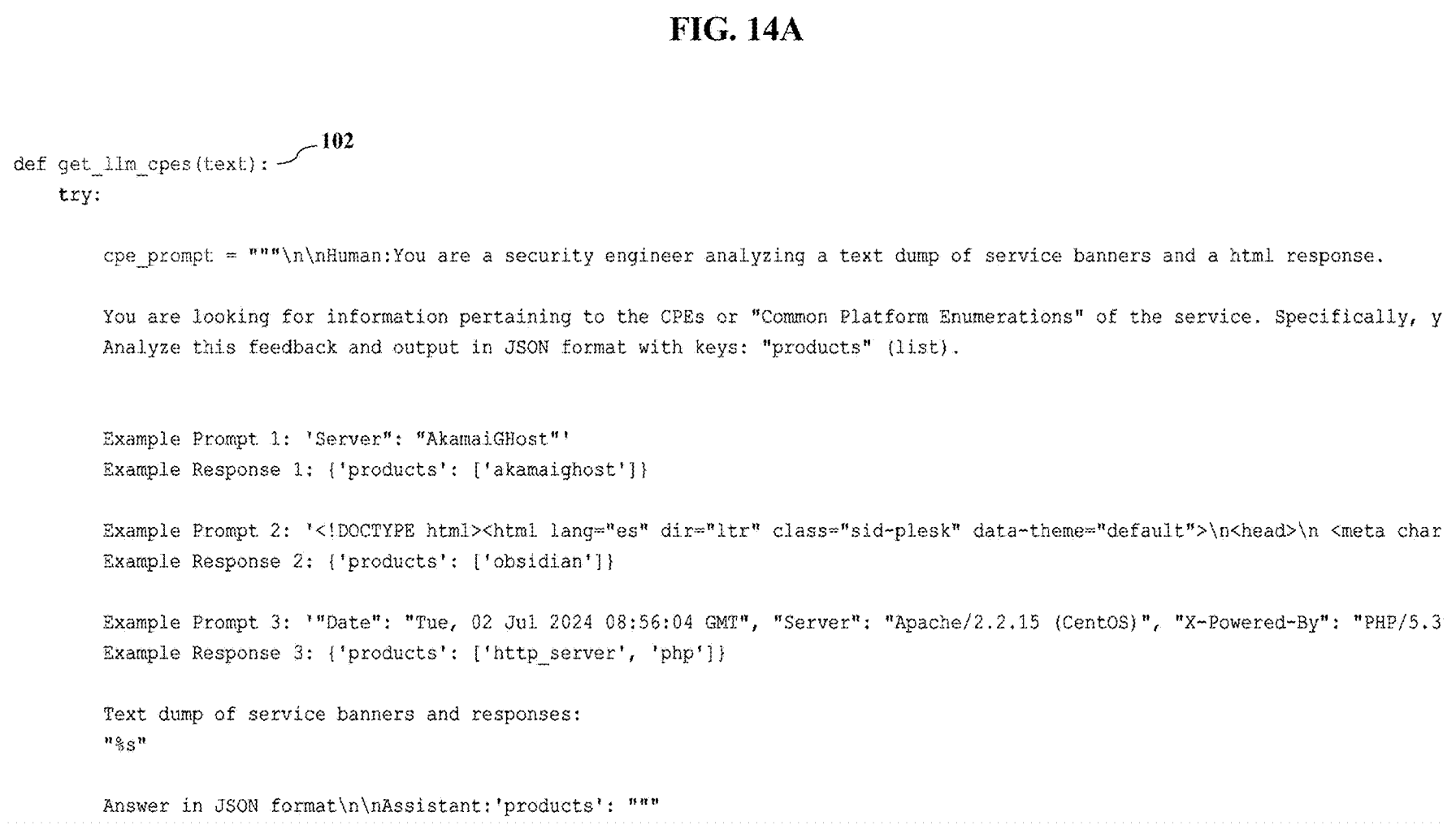

```
def get_llm_cpes(text): ———102
    try:

cpe_prompt = """\n\nHuman:You are a security engineer analyzing a text dump of service banners and a html response.

You are looking for information pertaining to the CPEs or "Common Platform Enumerations" of the service. Specifically, y
Analyze this feedback and output in JSON format with keys: "products" (list).

Example Prompt 1: "Server": "AkamaiGHost"'
Example Response 1: {'products': ['akamaighost']}

Example Prompt 2: "<!DOCTYPE html><html lang="es" dir="ltr" class="sid-plesk" data-theme="default">\n<head>\n <meta char
Example Response 2: {'products': ['obsidian']}

Example Prompt 3: "Date": "Tue, 02 Jul 2024 08:56:04 GMT", "Server": "Apache/2.2.15 (CentOS)", "X-Powered-By": "PHP/5.3
Example Response 3: {'products': ['http_server', 'php']}

Text dump of service banners and responses:
"%s"

Answer in JSON format\n\nAssistant:'products': """
```

FIG. 14B

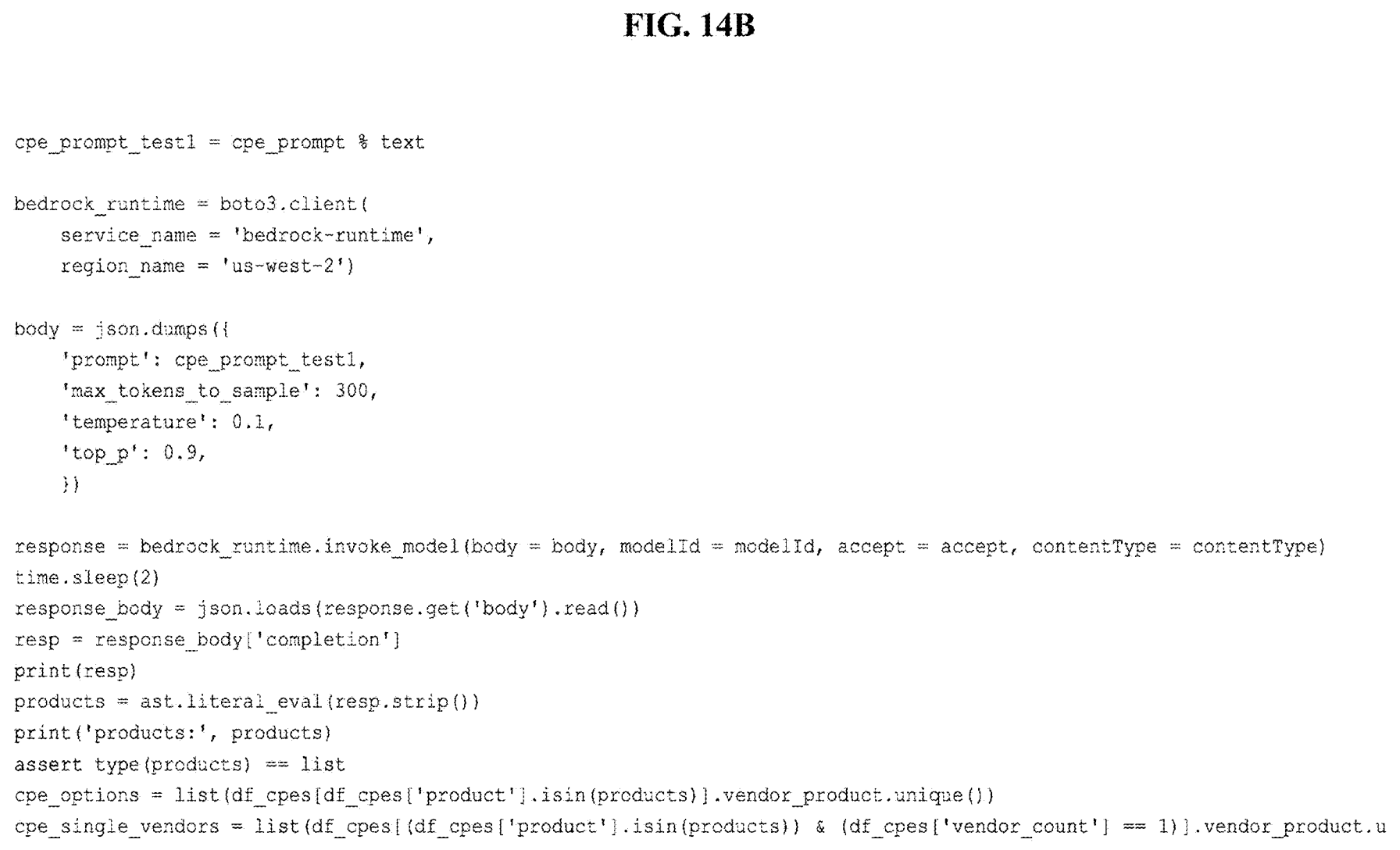

```
cpe_prompt_test1 = cpe_prompt % text bedrock_runtime = boto3.client(
    service_name = 'bedrock-runtime',
    region_name = 'us-west-2')

body = json.dumps({
    'prompt': cpe_prompt_test1,
    'max_tokens_to_sample': 300,
    'temperature': 0.1,
    'top_p': 0.9,
    })

response = bedrock_runtime.invoke_model(body = body, modelId = modelId, accept = accept, contentType = contentType)
time.sleep(2)
response_body = json.loads(response.get('body').read())
resp = response_body['completion']
print(resp)
products = ast.literal_eval(resp.strip())
print('products:', products)
assert type(products) == list
cpe_options = list(df_cpes[df_cpes['product'].isin(products)].vendor_product.unique())
cpe_single_vendors = list(df_cpes[(df_cpes['product'].isin(products)) & (df_cpes['vendor_count'] == 1)].vendor_product.u
```

FIG. 15A

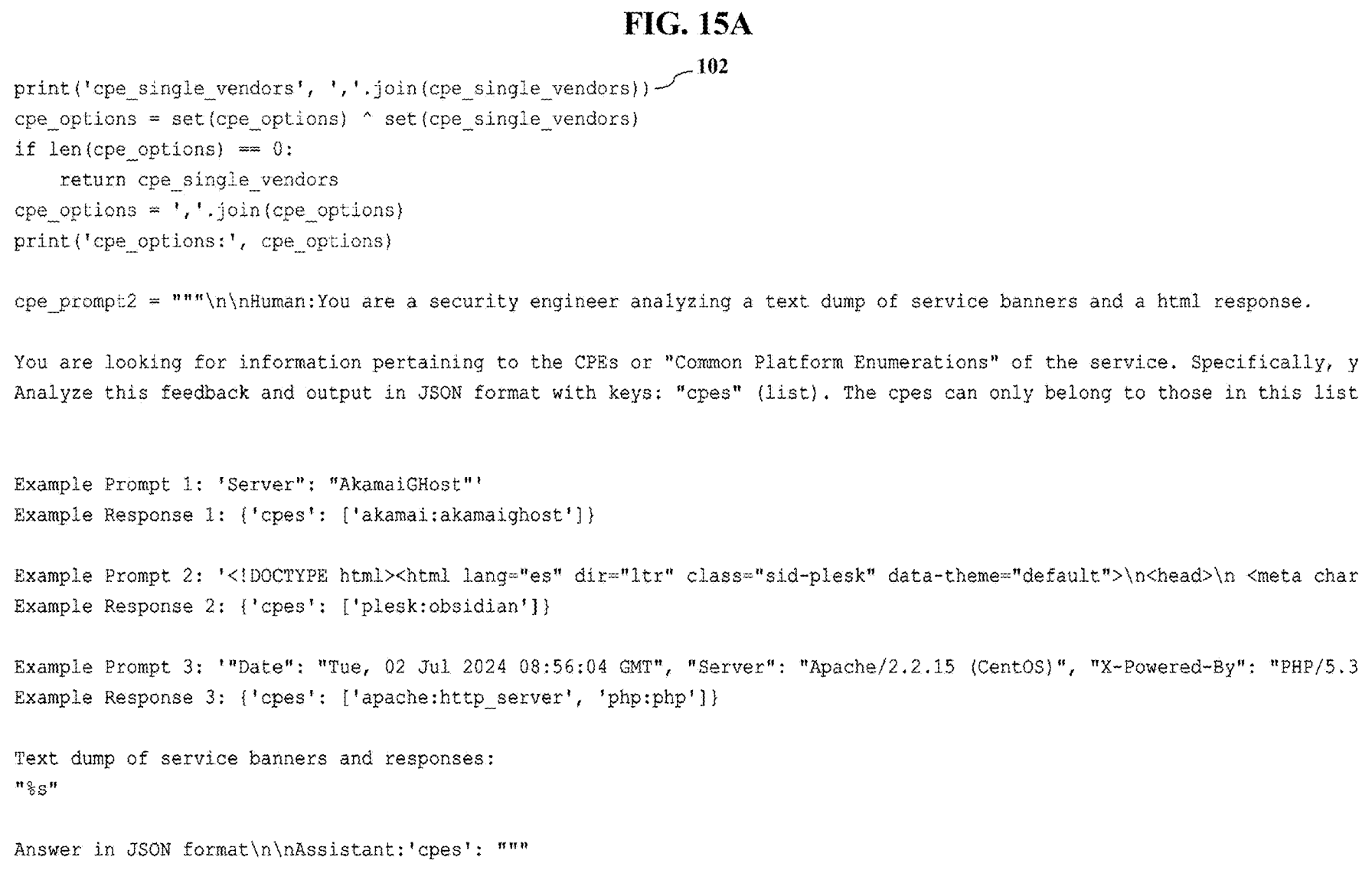

```
print('cpe_single_vendors', ','.join(cpe_single_vendors))                    102
cpe_options = set(cpe_options) ^ set(cpe_single_vendors)
if len(cpe_options) == 0:
    return cpe_single_vendors
cpe_options = ','.join(cpe_options)
print('cpe_options:', cpe_options)

cpe_prompt2 = """\n\nHuman:You are a security engineer analyzing a text dump of service banners and a html response.

You are looking for information pertaining to the CPEs or "Common Platform Enumerations" of the service. Specifically, y
Analyze this feedback and output in JSON format with keys: "cpes" (list). The cpes can only belong to those in this list Example Prompt 1: 'Server': "AkamaiGHost"'
Example Response 1: {'cpes': ['akamai:akamaighost']}

Example Prompt 2: '<!DOCTYPE html><html lang="es" dir="ltr" class="sid-plesk" data-theme="default">\n<head>\n <meta char
Example Response 2: {'cpes': ['plesk:obsidian']}

Example Prompt 3: "Date": "Tue, 02 Jul 2024 08:56:04 GMT", "Server": "Apache/2.2.15 (CentOS)", "X-Powered-By": "PHP/5.3
Example Response 3: {'cpes': ['apache:http_server', 'php:php']}

Text dump of service banners and responses:
"%s"

Answer in JSON format\n\nAssistant:'cpes': """
```

FIG. 15B

```
cpe_prompt_test2 = cpe_prompt2 % (cpe_options, text)

body = json.dumps({
    'prompt': cpe_prompt_test2, #'\n\nHuman:explain string theory to me like I am 5 years old\n\nAssistant:',
    'max_tokens_to_sample': 300,
    'temperature': 0.1,
    'top_p': 0.9,
})

response2 = bedrock_runtime.invoke_model(body = body, modelId = modelId, accept = accept, contentType = contentType)
time.sleep(2)

response_body2 = json.loads(response2.get('body').read())
resp_cpes = response_body2['completion']
print('resp_cpes:', resp_cpes)
cpes = ast.literal_eval(resp_cpes.strip())
cpes = list(set(cpes + cpe_single_vendors))
print('cpes:', cpes)
assert type(cpes) == list
cpes = [cpe for cpe in cpes if cpe in list(df_cpes['vendor_product']) + [None]]
return cpes except Exception as e:
    print(e)
```

Software Services Table                                                      38

| Field | Type | Description | Example |
|---|---|---|---|
| ip_address | str | IP Address | 104.77.227.179 |
| port | bigint | port number | 443 |
| transport | str | transport protocol | tcp |
| timestamp | timestamp | timestamp of service | 2024-07-02T15:32:58.779918 |
| banners | str | HTML response of http/s request | <HTML><HEAD>\n<TITLE>Invalid URL</TITLE>\n</HE... |
| attributes | str | Attribute metadata response from banner grabbing | {"cookies": [], "favicon_fingerprint": null, "server": "nginx", ... |
| protocol | str | protocol of service | http |
| cpes | list of strings | Yara-predicted CPEs | ["cpe:/a:php:php:5.3.3", "cpe:/a:apache:http_server"] |

Figure 23:
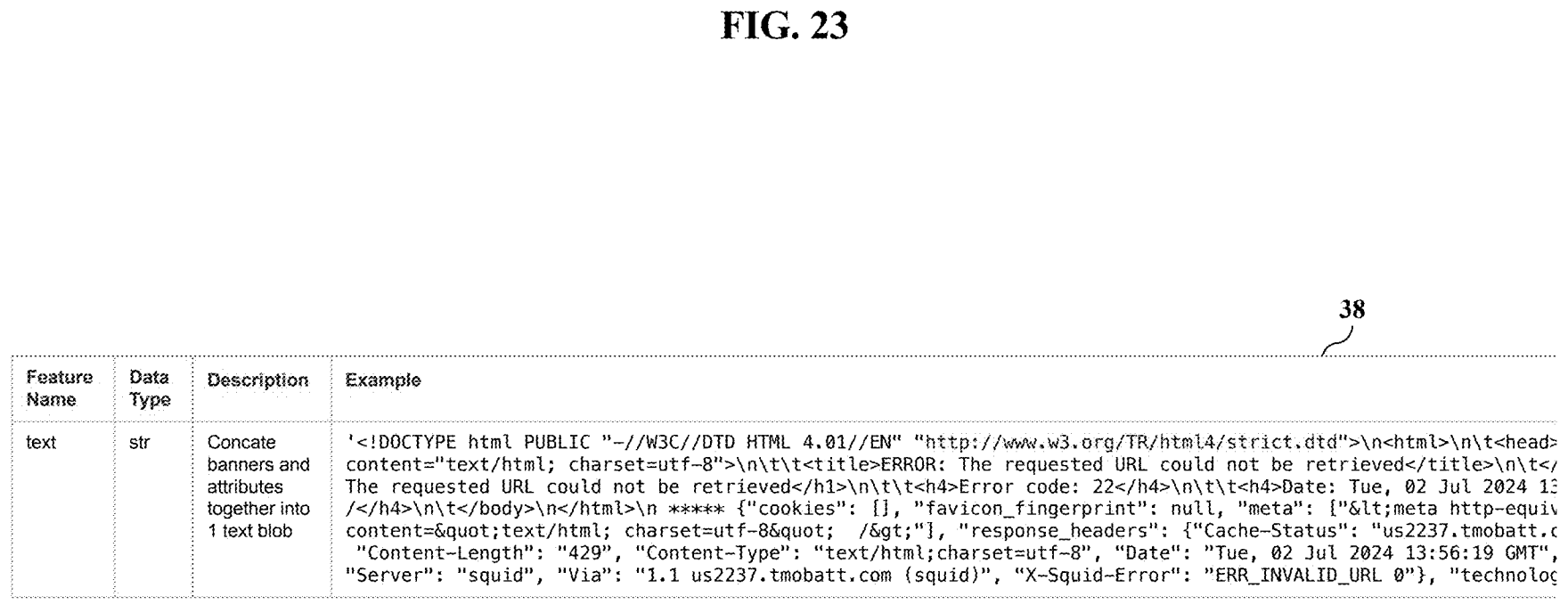

| Feature Name | Data Type | Description | Example |
|---|---|---|---|
| text | str | Concate banners and attributes together into 1 text blob | '<!DOCTYPE html PUBLIC "-//W3C//DTD HTML 4.01//EN" "http://www.w3.org/TR/html4/strict.dtd">\n<html>\n\t<head>content="text/html; charset=utf-8">\n\t\t<title>ERROR: The requested URL could not be retrieved</title>\n\t</The requested URL could not be retrieved</h1>\n\t\t<h4>Error code: 22</h4>\n\t\t<h4>Date: Tue, 02 Jul 2024 1:/</h4>\n\t</body>\n</html>\n ***** {"cookies": [], "favicon_fingerprint": null, "meta": ["<meta http-equiv content="text/html; charset=utf-8" />"], "response_headers": ["Cache-Status": "us2237.tmobatt.c"Content-Length": "429", "Content-Type": "text/html;charset=utf-8", "Date": "Tue, 02 Jul 2024 13:56:19 GMT","Server": "squid", "Via": "1.1 us2237.tmobatt.com (squid)", "X-Squid-Error": "ERR_INVALID_URL 0"}, "technolo |

FIG. 25

CPE PREDICTION USING
BANNER-PROMPTED LLM

BACKGROUND

The subject matter described herein generally relates to electrical communications and to computer security and, more particularly, the subject matter relates to computer vulnerability analysis.

Many computers are exposed to cybersecurity threats. It seems every day there is another cybersecurity hack that steals account passwords, business data, and personal information. Large computer networks, in particular, are especially vulnerable to cybersecurity threats. Large computer networks may have hundreds or even thousands of computers, so it's increasingly difficult to monitor such large numbers of computers. Many of these computers may unknowingly connect to the Internet and/or run outdated software, so these computers are especially vulnerable to cybersecurity threats.

SUMMARY

Accurate prediction of common platform enumeration (CPE) helps resolve cybersecurity vulnerabilities. Many software products and web services have an unknown CPE. The CPE identifies known cybersecurity vulnerabilities and software fixes. When the CPE is unknown, however, the cybersecurity vulnerabilities remain unresolved and computer functioning is jeopardized. A CPE prediction service, though, identifies which CPEs should be matched to their corresponding software products and web services. The CPE prediction service grabs web service banners and predicts the CPEs by banner-prompting a large language model (or "LLM"). The CPE prediction service identifies a CPE that matches or belongs to a software product or web service, based on the web service banners. The CPE prediction service thus elegantly and quickly matches a CPE to its corresponding software product or web service. Once the CPE is known, its cybersecurity vulnerabilities may be fixed and computer functioning is improved.

BRIEF DESCRIPTION OF THE SEVERAL
VIEWS OF THE DRAWINGS

The features, aspects, and advantages of common platform enumeration (or CPE) prediction using a banner-prompted LLM are understood when the following Detailed Description is read with reference to the accompanying drawings, wherein:

FIGS. 4-9 illustrate some examples of a common platform enumeration (or CPE) prediction service;

FIG. 10 illustrates more examples of CPE prediction using a banner-prompted large language model (or LLM);

Figure 16:
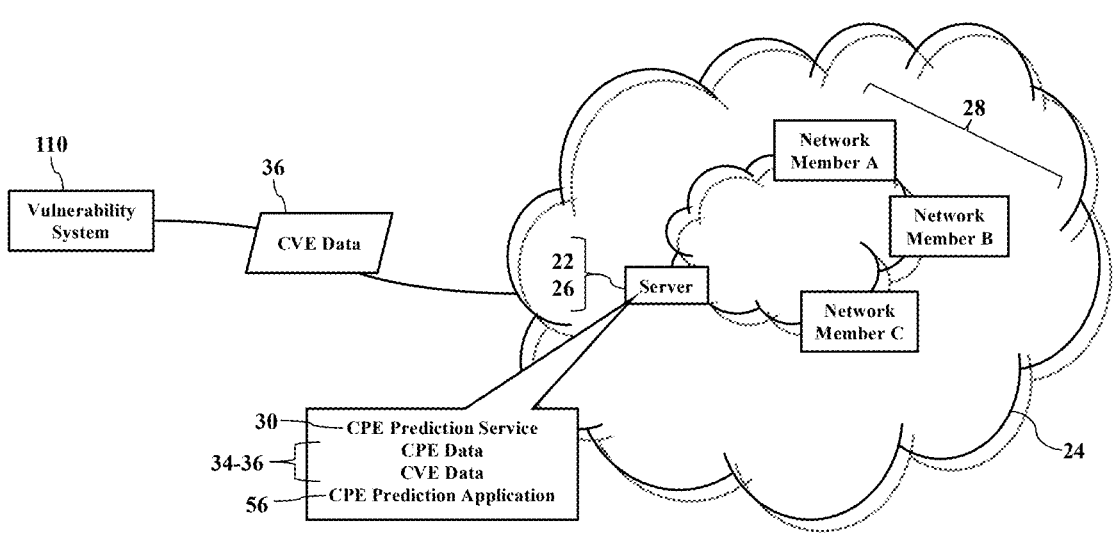
Figure 17:
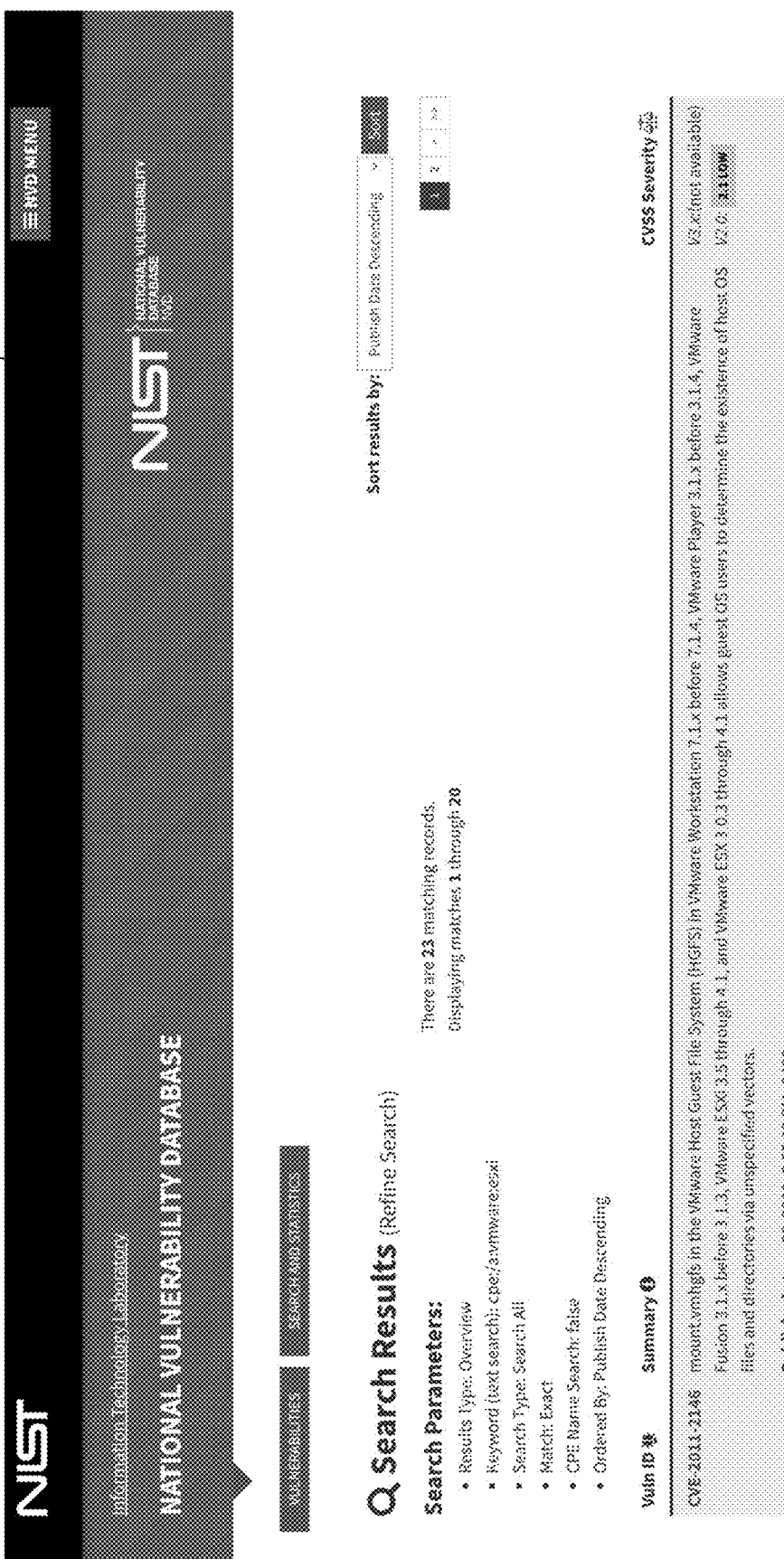
Figure 18:
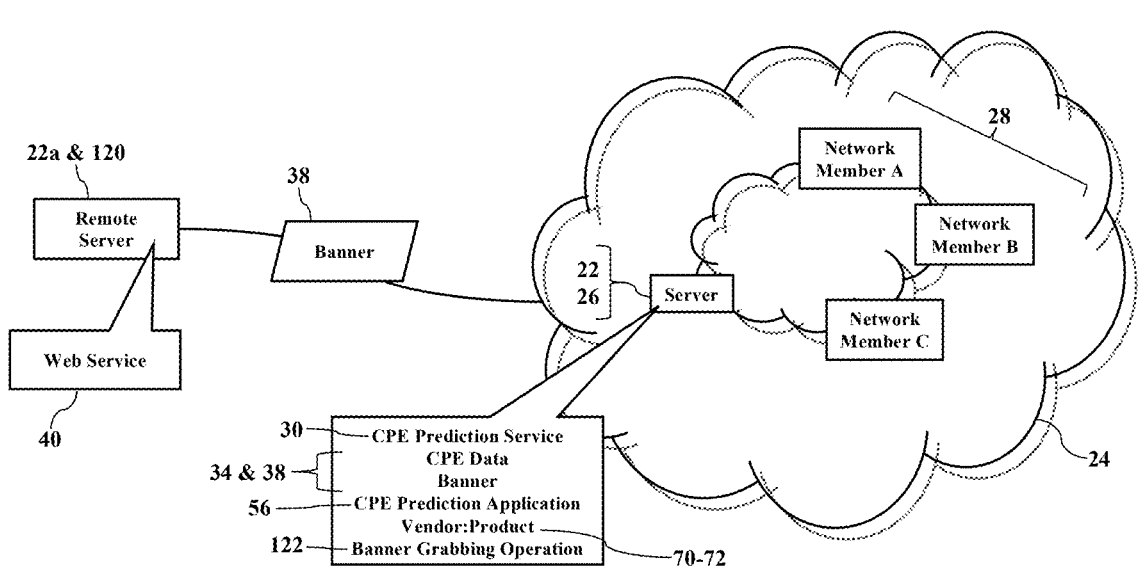
Figure 19:
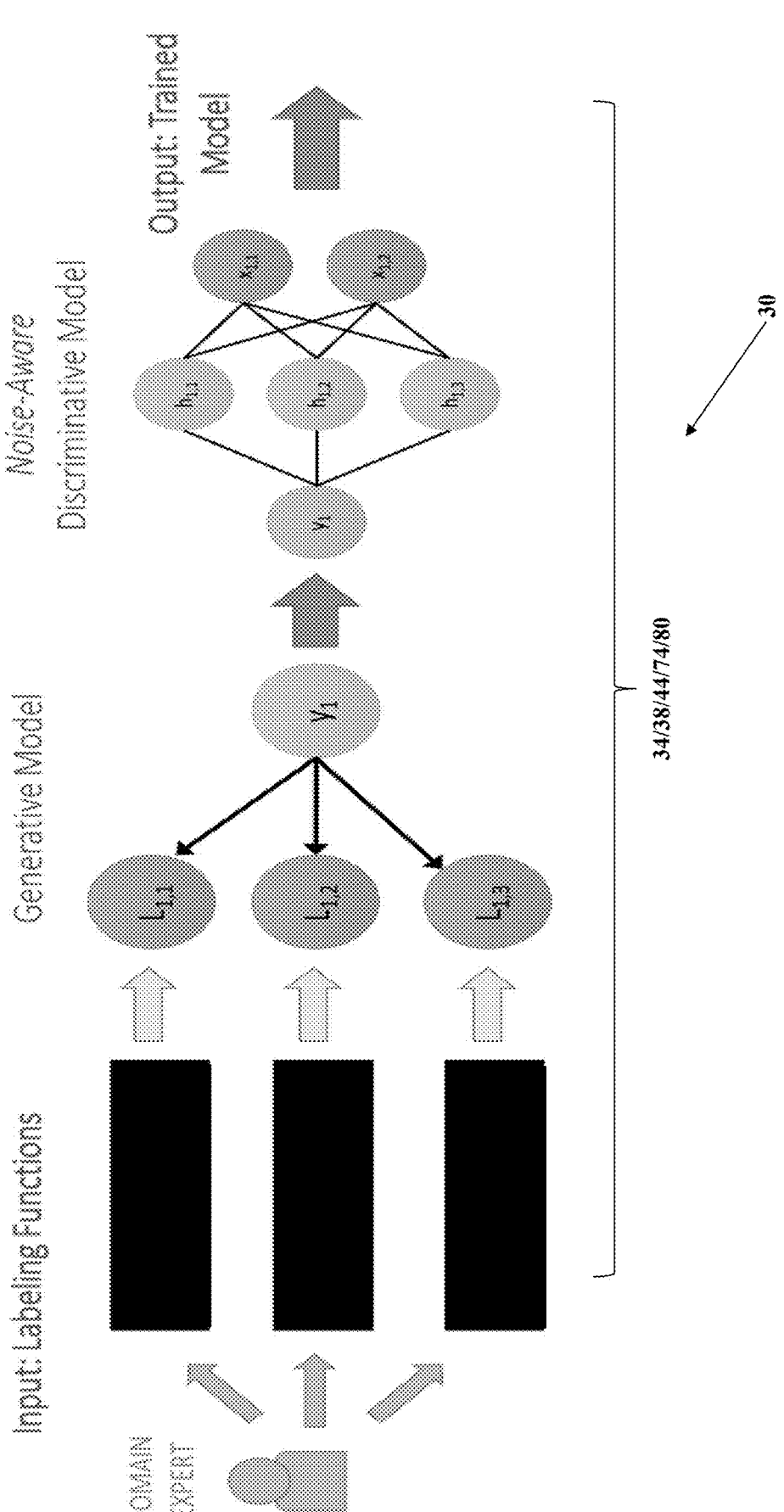
Figure 21:
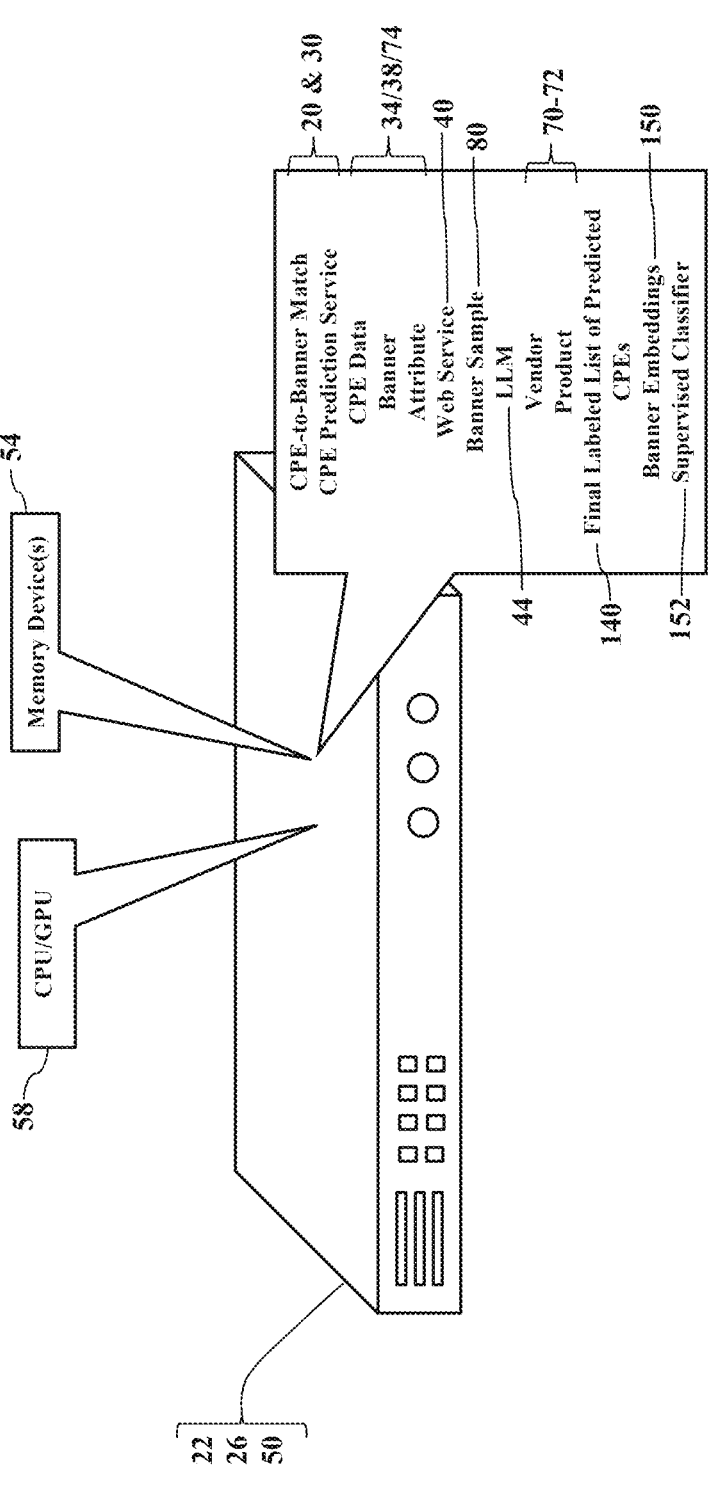
Figure 26:
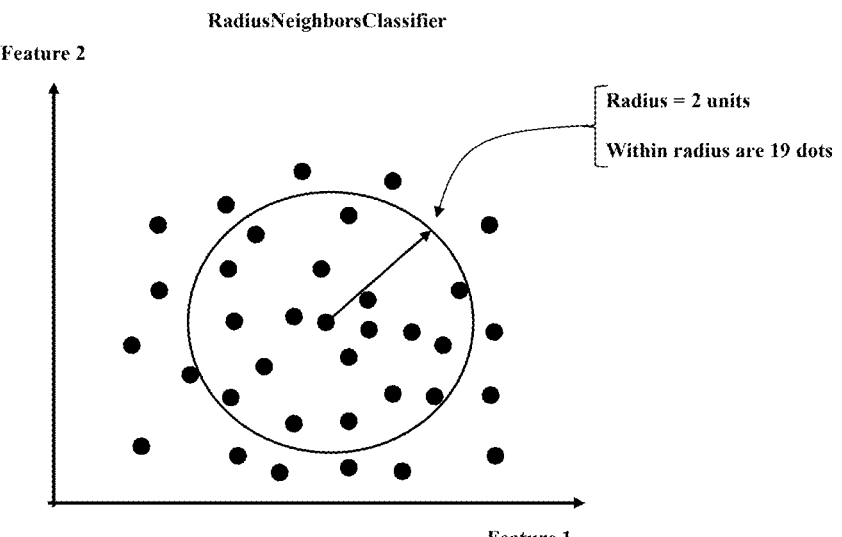
Figure 27:
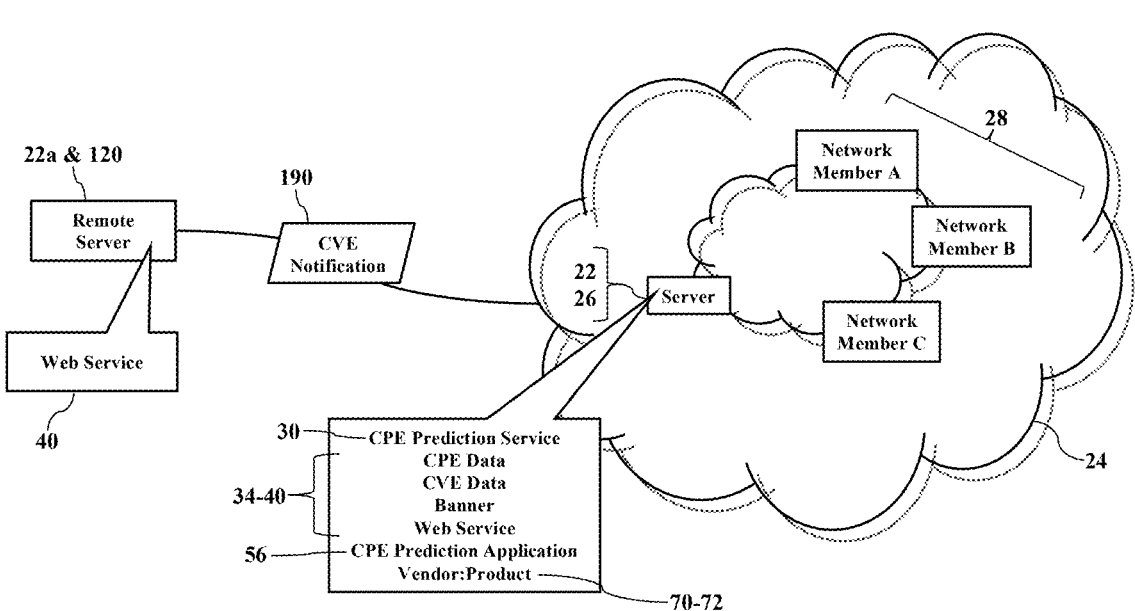

FIGS. 11-13, 14A-14B, and 15A-15B illustrate more examples of CPE prediction using the banner-prompted LLM;

FIGS. 16-17 illustrate some examples of vulnerability identification;

FIG. 18 illustrates some examples of banner grabbing;

FIG. 19 illustrates a detailed example of the service architecture;

Figure 20:
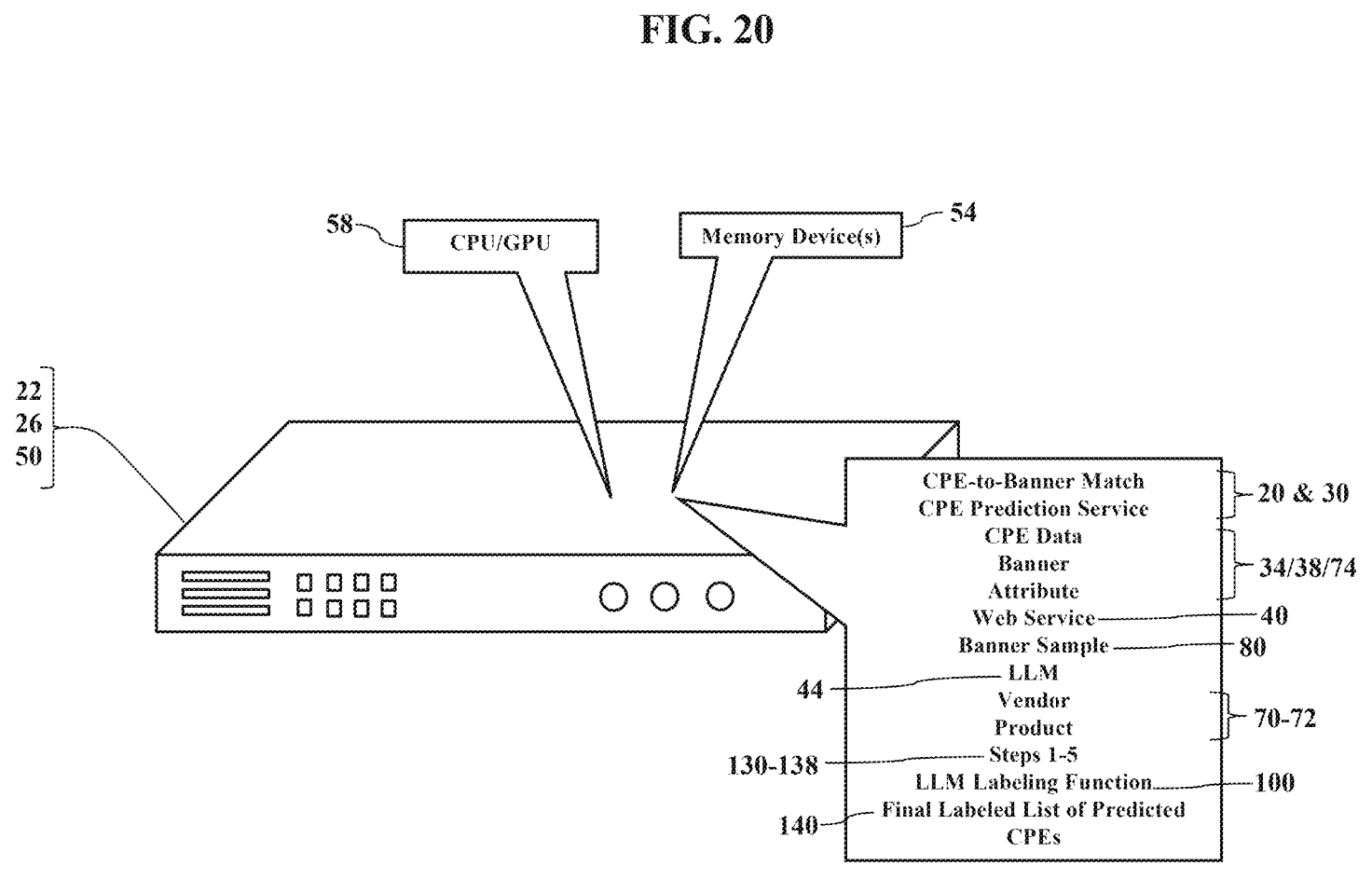

FIGS. 20-21 illustrate examples of supervised classification;

Figure 25:
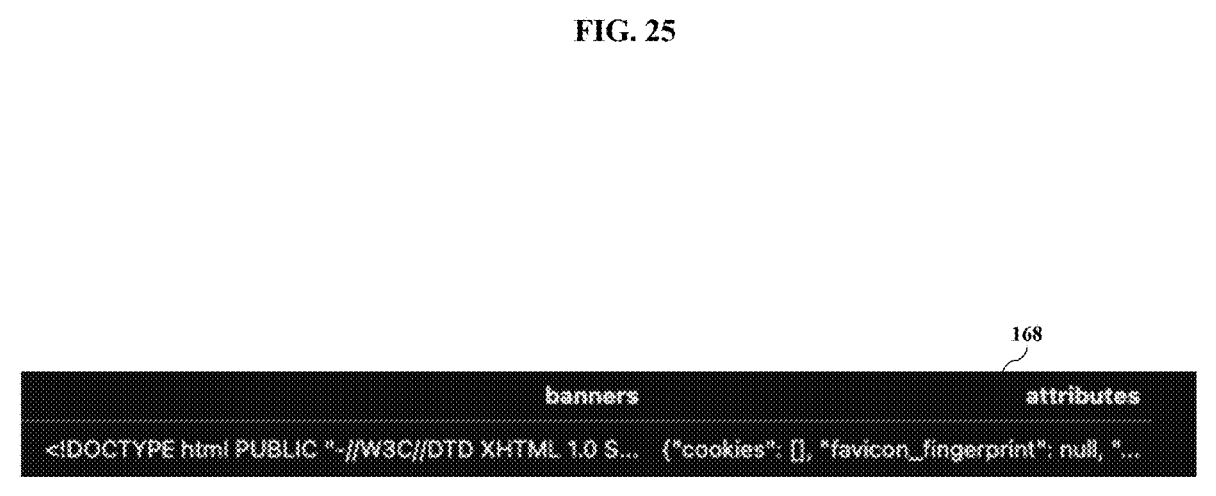

FIGS. 22-25 illustrate examples of data transformations and feature engineering;

FIG. 26 illustrates more examples of improved computer functioning;

FIG. 27 illustrates examples of cybersecurity notifications

Figure 28:
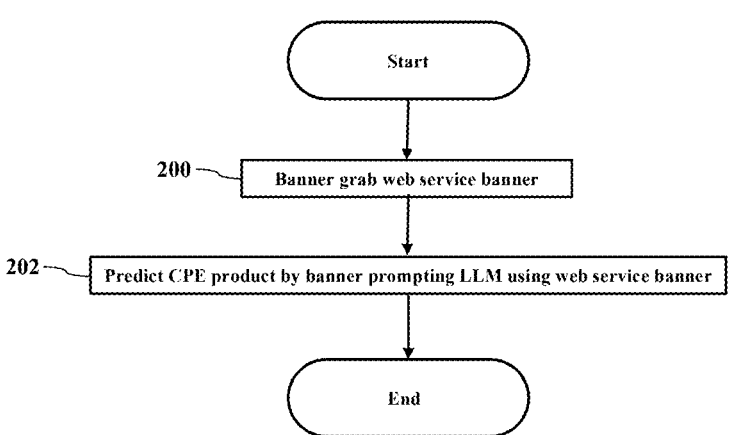
Figure 29:
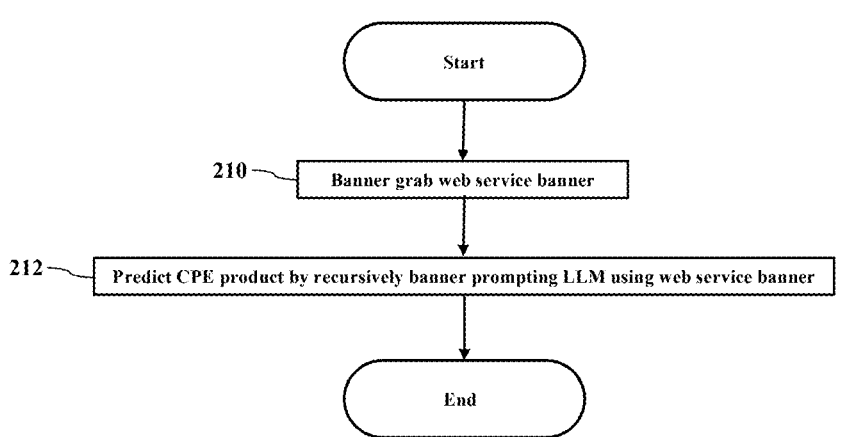
Figure 30:
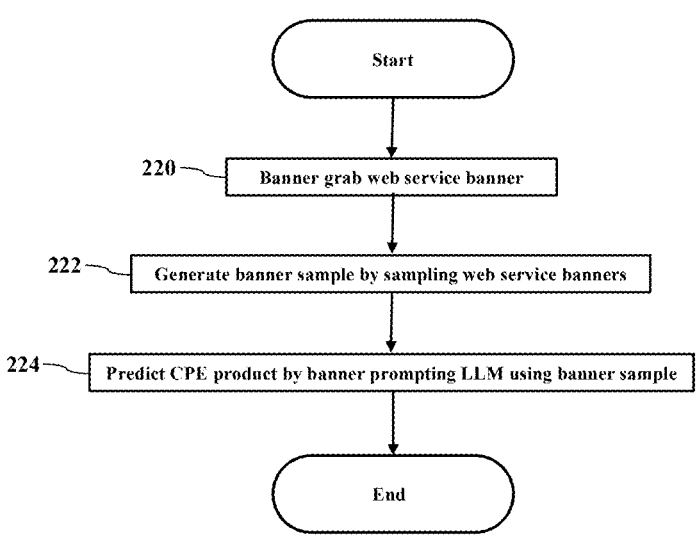
Figure 31:
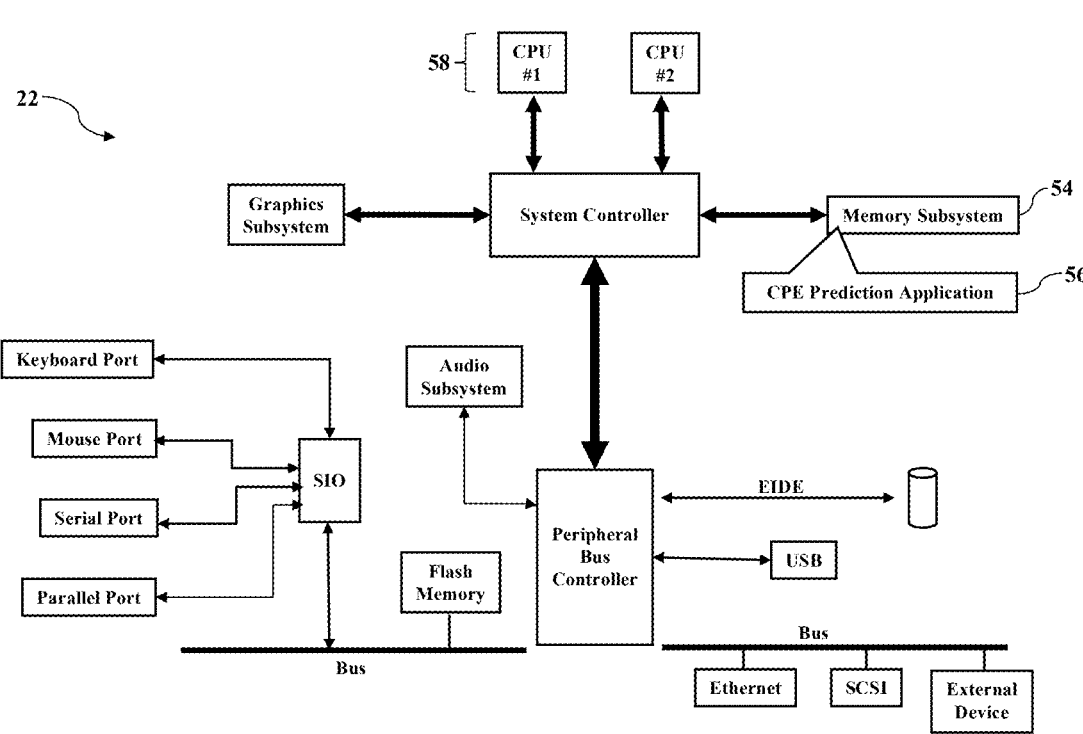

FIGS. 28-30 illustrate examples of methods or operations that predict common platform enumeration (CPE) products; and FIG. 31 illustrates a more detailed example of the operating environment.

DETAILED DESCRIPTION

Old and outdated software is especially vulnerable to cybersecurity threats. As we all know, nearly every day there is another cybersecurity hack that steals account passwords, business data, and personal information. Many of these cybersecurity hacks can be traced back to old and outdated software. People and companies simply fail to update their computer software with the latest fixes. Indeed, some companies are still using years-old or even decades-old software that is easily exploited by hackers.

Some examples relate to predicting when computers need software updates. A common platform enumeration (or CPE) prediction service simply, quickly, and elegantly predicts when a computer needs a software update. The CPE prediction service, in particular, identifies computers that are unknowingly connected to the public Internet. These unknown, Internet-facing computers are blind spots to users and to IT administrators. These unknown, Internet-facing computers may thus be riddled with vulnerable software. The CPE prediction service, however, identifies a computer that connects to the public Internet. The CPE prediction service then also predicts one or more software vendors, products, and versions that are installed to the computer. Once the CPE prediction service predicts what software is installed to the computer, the CPE prediction service may then quickly and easily determine whether the software is out of date. The CPE prediction service, for example, may use the predicted software vendor/product/version to lookup the known vulnerabilities, patches, and other updates. The CPE prediction service may thus alert consumers and companies that they have an Internet-exposed computer running outdated software that is vulnerable to cybersecurity attacks.

The CPE prediction service will now be described more fully hereinafter with reference to the accompanying drawings. The CPE prediction service, however, may be embodied in many different forms and should not be construed as limited to the examples set forth herein. These examples are provided so that this disclosure will be thorough and complete and fully convey the CPE prediction service to those of ordinary skill in the art. Moreover, all the examples of the CPE prediction service are intended to encompass both structural and functional equivalents thereof. Additionally, it is intended that such equivalents include both currently known equivalents as well as equivalents developed in the future (i.e., any elements developed that perform the same function, regardless of structure).

Figure 1:
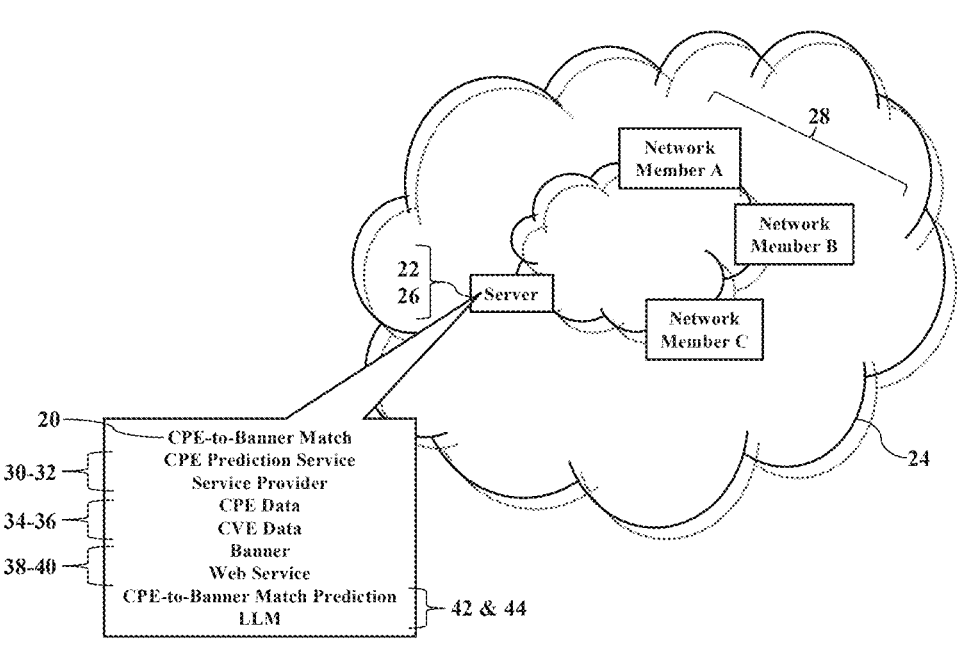
FIGS. 1-3 illustrate some examples of predicting CPE-to-banner matches.
Figure 2:
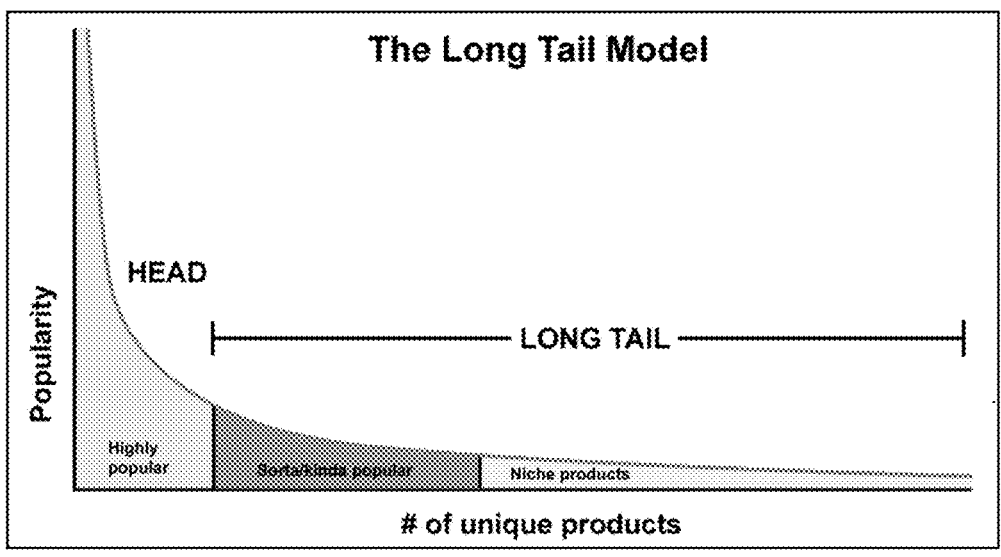
Figure 3:
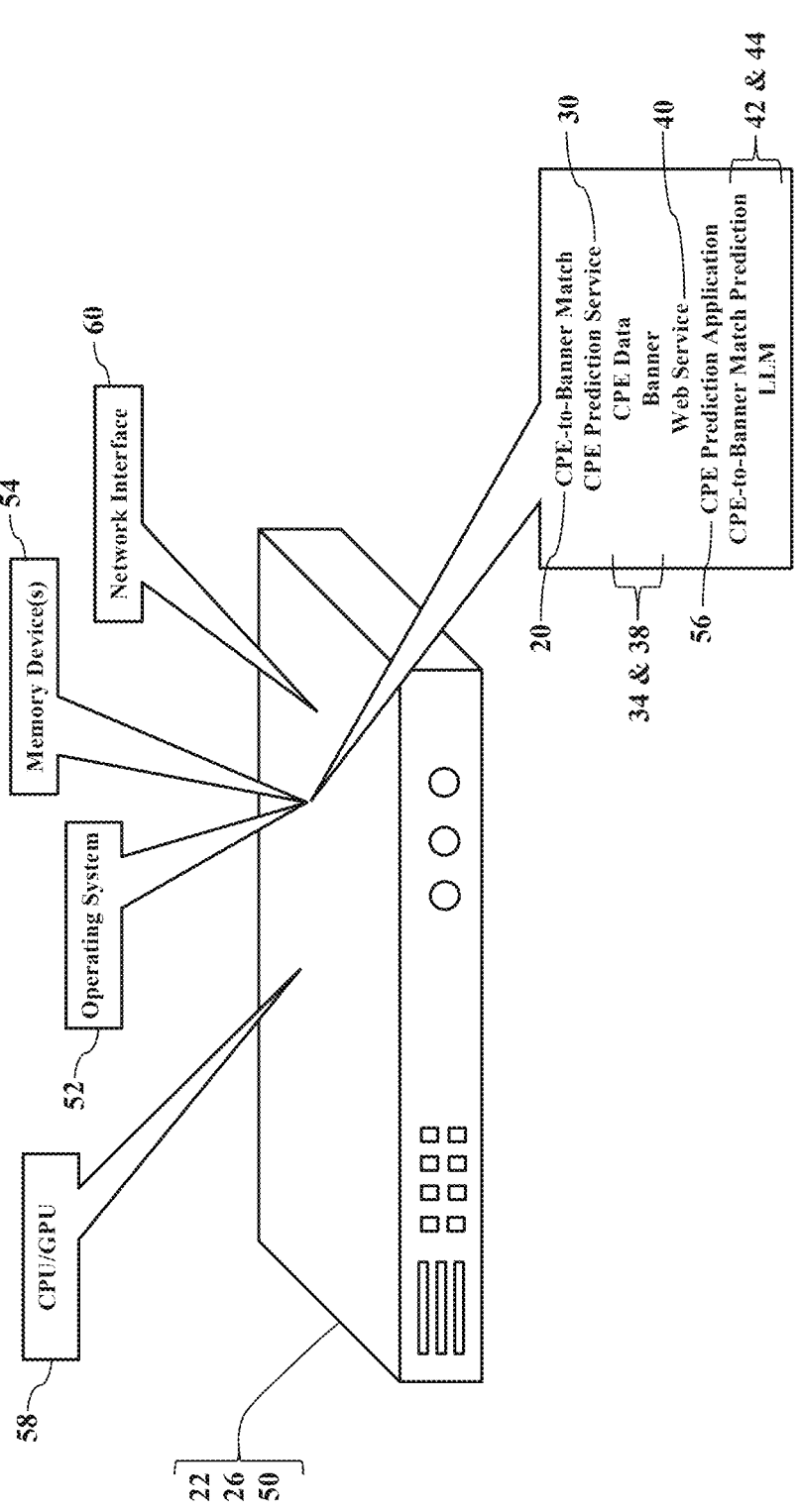

FIGS. 1-3 illustrate some examples of predicting CPE-to-banner matches 20. A computer system 22 operates in a cloud computing environment 24. FIG. 1 illustrates the computer system 22 as a server 26. The computer system 22, though, may be any processor-controlled device, as later paragraphs will explain. In this example, the server 26 communicates via the cloud computing environment 24 (e.g., public Internet, private network, and/or hybrid network) with other servers, devices, computers, or other networked members 28 operating within, or affiliated with, the cloud computing environment 24. The cloud computing environment 24 provides a common platform enumeration (or CPE) prediction service 30 on behalf of a service provider 32. The CPE prediction service 30 retrieves or acquires common platform enumeration (or CPE) data 34. The CPE prediction service 30 may also retrieve or acquire common vulnerabilities and exposures (or CVE) data 36. The CVE data 36 describes known cybersecurity vulnerabilities and exposures for the corresponding CPE data 34. The CPE prediction service 30 also retrieves or acquires one or more service banners 38 that are associated with a software-based web service 40. The cloud computing environment 24 may then analyze the CPE data 34, the CVE data 36, and/or the service banner(s) 38 to generate a CPE-to-banner match prediction 42 using a large language model 44 (or LLM). The CPE-to-banner match prediction 42, in plain words, predicts which one or more CPEs match, belong to, or provide the web service 40.

As FIG. 2 illustrates, accurate identification of CPEs and CVEs has long been a problem. Computers have been around for decades, and computer software services have exponentially grown. It's estimated, for example, that, over the decades, there have been nearly 43,000 known software applications (e.g., vendor:product CPEs) in the field, representing a long-tail distribution of niche products that are prominent across organizations. Today, however, conventional rules-based schemes only cover about 318 of these CPEs. Because each rule requires hours of work to write and validate, it's simply not humanly practical, nor economically feasible, to implement rules that define all the 43,000 known computer software services 40 (such as different software products/versions offered by many different vendors). Indeed, it's estimated that nearly 40% of HTTP/HTTPS services have zero/no CPE coverage from existing rules. Many computer software services 40, for example, are old, legacy, or unpopular versions that are still in use. Because many computer software services 40 lack their corresponding CPE data 34, these computer software services 40 are especially vulnerable to cyberattacks. Because the CPE data 34 is unknown, it's very difficult for IT administrators to determine the CVE data 36. So, simply put, if the CPE data 34 is unknown, IT and cybersecurity professionals can't search the CVE data 36 for the corresponding web service 40. Without the CPE data 34, IT and cybersecurity professionals are blind to the cybersecurity risks associated with the web service 40.

Returning to FIG. 1, the CPE prediction service 30, though, predicts which CPE data 34 corresponds to the CVE data 36 and to the web service 40. When the cloud computing environment 24 receives the CPE data 34, the CVE data 36, and/or the service banner 38 associated with the web service 40, the nodal networked members 28 inspect and analyze the CPE/CVE data 34/36 and the banner 38. While there may be many networked members 28 of the cloud computing environment 24, FIG. 1 illustrates a simple example using the server 26. That is, when the cloud computing environment 24 receives the CPE data 34, the CVE data 36, and/or the service banner 38, the nodal networked members 28 may forward the CPE data 34, the CVE data 36, and the service banner 38 to the server 26. The server 26 is programmed to predict the CPE data 34 that corresponds to the web service 40, using the large language model 44 (or LLM). The server 26 generates the CPE-to-banner match prediction 42 that identifies which CPE data 34 corresponds to the web service 40.

As FIG. 3 illustrates, the server 26 is programmed to predictively match the CPE data 34 to the web service 40. FIG. 3 illustrates the server 26 as a rack server 50, which is commonly installed in server rooms and in server farms. The server 26/50 is programmed to provide the common platform enumeration (or CPE) prediction service 30. The server 26/50 predicts the CPE data 34 that corresponds to the web service 40 using the service banner 38 and the large language model 44 (or LLM). The server 26/50 stores and executes an operating system 52 in a memory device 54. The server 26/50 also stores a cybersecurity CPE prediction application 56 in the memory device 54. The server 26/50 has a hardware processor with cores 58 (illustrated as "CPU/GPU") that reads and executes the operating system 52 and the cybersecurity CPE prediction application 56. The server 26/50 also has network interfaces 60 to multiple communications networks (such as the cloud computing environment 24 illustrated in FIG. 1), thus allowing bi-directional communications with other networked devices and services. The cybersecurity CPE prediction application 56 has programming code or instructions that cause the server 26 to perform operations, such as determining the CPE-to-banner match 20 by generating the CPE-to-banner match prediction 42. The cybersecurity CPE prediction application 56 thus programs the server 26/50 to predict whether the CPE data 34 corresponds to the web service 40, using the LLM 44 and banner data representing the banner 38.

Figure 4:
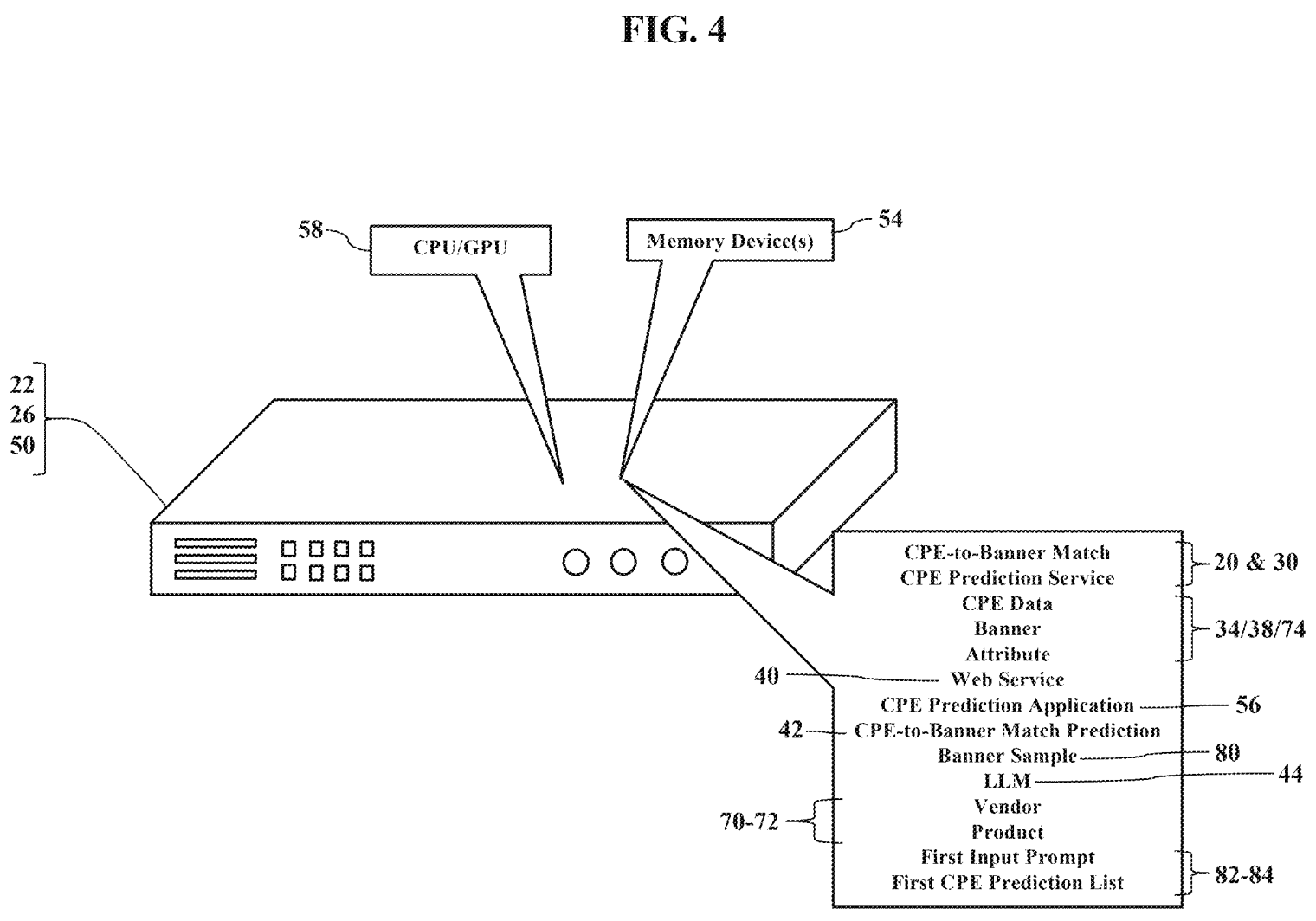
Figure 5:
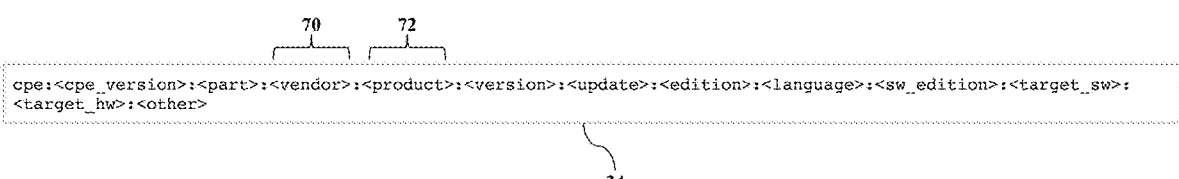
Figure 6:
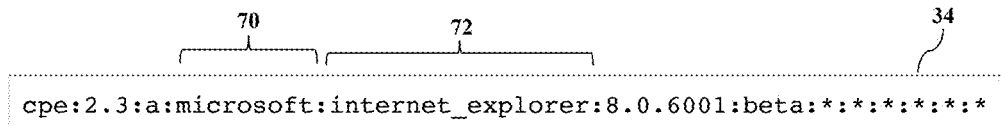

FIGS. 4-9 illustrate some examples of the common platform enumeration (or CPE) prediction service 30. FIG. 4 illustrates the computer system 22 (again illustrated as the rack server 50) providing the CPE prediction service 30. The CPE prediction application 56 may cause or instruct the server 26/50 to retrieve the CPE data 34. FIGS. 5-7 illustrate examples of the data fields representing the CPE data 34. FIG. 6, in particular, illustrates the CPE data 34 identifying the MICROSOFT INTERNET EXPLORER® in a vendor data field 70 and in product data field 72. FIG. 7 illustrates a tabularized version of more CPE data 34 identifying an APACHE® web server product (e.g., the vendor data field 70 and the product data field 72). The CPE prediction application 56 may also cause or instruct the server 26/50 to retrieve the banner data representing the banner 38. FIGS. 8-9 illustrate examples of the banner data fields representing the banner 38. The banner 38 may thus also identify or specify the vendor 70 and a product 72 (such as an APACHE® web server running the UBUNTU® operating system, version 2.4.29). FIG. 9, in particular, illustrates a tabularized version of more banner data, with the banner 38 specifying a metadata banner attribute 74.

Returning to FIG. 4, artificial intelligence may be used. The CPE prediction application 56 may instruct the server 26/50 to generate and/or to retrieve a validation banner sample 80. The banner sample 80 may describe or contain labeled banners 38, attributes 74, and/or web services 40 associated with hundreds or even thousands of CPEs (e.g., the CPE data 34). The CPE prediction service 30, for example, may use passive or active banner grabbing techniques that periodically or randomly send HTTP/HTTPS queries to public and/or private IP addresses (as this disclosure will later explain). The CPE prediction service 30 may then receive and log the banners/attributes 38/74 that are sent as HTTP/HTTPS responses. Each banner/attribute 38/74 describes information about a remote/networked computer system hosting the corresponding web service 40. Each banner 38 may also describe the metadata attribute 74 associated with the remote/networked computer system hosting the corresponding web service 40. The banners/ attributes 38/74 may then be initially labeled (such as by using human review and/or by using YARA rules). The server 26/50 may thus acquire the banner sample 80 describing hundreds or thousands of the web services 40 and/or their corresponding banner/attribute 38/74 and the CPE vendor/product 70/72 (e.g., the CPE data 34). As an example, prototype testing generated the banner sample 80 by randomly sampling 20,000 web services 40, with about 63% of the web services 40 having at least one CPE labeled/identified using YARA rules (spanning across 137 unique YARA rules).

The banner sample 80 may then be applied to the large language model 44 (or LLM). The banner sample 80 may correlate several or even hundreds/thousands of CPE products 70/72 (e.g., the labeled CPE data 34) to their corresponding labeled banners 38, attributes 74, and/or web services 40. The CPE prediction service 30 may then initially banner-prompt the LLM 44 using the banner sample 80 as an input. Because the LLM 44 may be publicly available, the LLM 44 need not be pre-trained nor fine-tuned with the labeled banners 38, attributes 74, and/or web services 40. If time and budgets permit, of course, the LLM 44 may be trained and tuned using hundreds or even thousands of labeled/unlabeled CPE products (e.g., the web service banners 38, the attributes 74, and the vendor/product data fields 70/72). The CPE prediction service 30 may thus use the LLM 44 as a first-pass CPE predictor engine. The CPE prediction service 30 and the CPE prediction application 56 may then generate the CPE-to-banner match prediction(s) 42 by banner-prompting the LLM 44. The CPE prediction application 56, for example, may first input prompt 82 the LLM 44 with one or more of the banners/ attributes 38/74, and the LLM 44 predicts a first CPE prediction list 84 specifying the corresponding/matching CPE product (i.e., the CPE data 34).

Because the CPE data 34 is associated with the banner/ attribute 38/74, the CPE prediction application 56 may further predict/determine the CPE vendor 70 and the CPE product 72 associated with the banner/attribute 38/74. The CPE prediction service 30 banner-prompts the LLM 44, and the LLM 44 responds with the first pass predicted CPE products (e.g., the first CPE prediction list 84 specifying the corresponding/matching CPE data 34). Once the CPE data 34 is predicted, the CPE prediction application 56 that then identify the corresponding CPE vendor 70 and the CPE product 72 (such as by reading the web service banner 38 and/or by reading the predicted CPE data 34, as illustrated by FIGS. 5-9). That is, by predicting the CPE data 34 that corresponds with the prompting banner(s)/attribute(s) 38/74, the CPE data 34 is also associated with the corresponding web service 40. The CPE prediction application 56 may thus use the web service banner/attribute 38/74 and/or the CPE data 34 to determine the CPE vendor 70 and the CPE product 72 that provides the web service 40.

The CPE prediction service 30 identifies novel CPE products and vendors. Conventional CPE schemes use custom rules (such as YARA rules and regular expressions) that are very difficult and time-consuming to define. Because the conventional rules are so complex, conventional CPE schemes are too difficult and too expensive to implement for all CPEs. The conventional CPE schemes thus leave a large chunk of computer software services with unidentified CPEs. The CPE prediction service 30, though, elegantly uses data mining and artificial intelligence (e.g., the large language model 44) to discover new relationships between CPE products (e.g. the CPE data 34) and computer software services 40. The CPE prediction service 30 identifies novel CPE products by banner-prompting the LLM 44 using the banners/attributes 38/74. The CPE prediction service 30 recognizes that the CPE vendor/product data field(s) 70-72 is/are perhaps an important data component of the CPE data 34 and a core identifier (e.g., the vendor:product field combination of the CPE data 34). Moreover, because the LLM 44 may excel at parsing the banners/attributes 38/74 (as later paragraphs will explain), the LLM 44 outputs semantically-labeled CPE products (e.g., the vendor:product field combination of the CPE data 34).

FIG. 10 illustrates more examples of CPE prediction using the banner-prompted large language model 44 (or LLM). The LLM 44 may be refined using additional the CPE-to-banner match prediction(s) 42. That is, after the LLM 44 generates the first predictive CPE list 84 (e.g., the CPE products predicted in response to the first input prompt 82), the CPE prediction application 56 may retrieve the CPE data 34 and then filter the CPE data 34 according to the LLM-predicted CPE products (e.g., the first predictive CPE list 84). The CPE prediction service 30, in other words, may remove (or filter out) whatever CPE data 34 that does not correspond to or match the CPE-to-banner match prediction (s) 42. The CPE data 34 may thus represent a filtered or positively-predicted CPE list 90 of only the CPE products predicted by the LLM 44 (given the banners/attributes 38/74). For example, if the predicted CPE has at least a single CPE vendor 70, then this CPE product will be included in the filtered or positively-predicted CPE list 90. The LLM 44 may then again be banner-prompted or reprompted (e.g., a second input banner prompt 92) to predict a second list 94 of the CPE products, given the banners 38 and the attributes 74 associated with the filtered, positively-predicted CPE list 90. Indeed, the CPE prediction application 56 may repeatedly/recursively banner-prompted (e.g., third input banner prompt 96) the LLM 44 on all the web services 40 specified by the banner sample 80, thus returning a final list 98 of the predicted CPEs for each web service 40 in the banner sample 80. If no predicted CPEs are determined, though, an empty list may be returned.

FIGS. 11-15B illustrate more examples of CPE prediction using the banner-prompted/trained large language model 44 (or LLM). The CPE prediction service 30 elegantly and accurately predicts CPE products using the web service banners 38 and/or the attributes 74. The CPE prediction service 30 gathers data by pulling the CPE data 34 from VulnCheck and the National Vulnerabilities Database (NVD) as well as the web service banners 38 and the attributes 74 from IP address scans. The CPE prediction service 30 may then implement an LLM labeling function 100 using the web service banners 38 and the attributes 74. The CPE prediction service 30, for example, calls whatever LLM 44 is desired (such as CHATGPT®, LLAMA®, or CLAUDE®) that suits performance, costs, and/or other criteria. The CPE prediction service 30 may then multiple times call and banner-prompt the LLM 44 for each web service 40 specified by the banner sample 80. FIG. 12, for illustrates an example of the first input prompt 82 to the LLM 44. The first input banner prompt 82 asks the LLM 44 to predict the first CPE prediction list 84 of CPE products given the web service banners 38 and/or the attributes 74. The CPE prediction service 30 may then generate the filtered, positively-predicted CPE list 90 by automatically filtering the first CPE prediction list 84 (as also explained with reference to FIG. 10) to those CPE vendors/products 70/72 included in the list of LLM-predicted CPE products. Again, if the product has one (1) vendor/product 70/72, this CPE may be included in the final list. FIG. 13 illustrates the second input banner prompt 92 to the LLM 44. The second input banner prompt 92 asks the LLM 44 to repredict the CPE vendor/product 70/72 given the banners 38, attributes 74, and/or the filtered, positively-predicted CPE list 90 generated in response to the first input banner prompt 82 (as also explained with reference to FIGS. 10-12). The LLM 44 may be again prompted as many times as desired (such as the third input banner prompt 96) to refine the predicted CPE products and to generate the final CPE prediction list 98. Once the final CPE prediction list 98 is determined, the CPE prediction service 30 may automatically call the LLM labeling function 100. The CPE prediction application 56, for example, may interface with the LLM labeling function 100 as a module or service that instructs or causes the server 26/50 to automatically generate a CPE input labeling prompt 102 (as illustrated by FIGS. 14A-15B). The LLM 44 is thus prompted to accurately label the predicted CPE products specified by the final CPE prediction list 98 (perhaps using the labeled banner sample 80).

FIGS. 16-17 illustrate some examples of vulnerability identification. Once the common platform enumeration (or CPE) data 34 is predictively matched to the web service 40, the CPE prediction service 30 may also retrieve the common vulnerabilities and exposures (or CVE) data 36 that corresponds to the CPE data 34. The CPE prediction application 56, for example, may instruct the server 26/50 to query a vulnerability system 110 for the CPE data 34. The CPE prediction service 30, as examples, may interface with the public National Vulnerability Database. The CPE prediction service 30, as more examples, may interface with private vulnerability systems (such as the VULNCHECK® system at www.vulncheck.com). Whatever vulnerability system 110 is used, the vulnerability system 110 sends a query response identifying the CVE data 36 that corresponds to the CPE data 34. As FIG. 17 illustrates, the CVE data 36 describes exploits, vulnerabilities, and other cybersecurity intelligence related to the CPE data 34. When the CPE prediction service 30 retrieves the CVE data 36, the CPE prediction application 56 may thus determine the cybersecurity vulnerabilities (and perhaps the solutions) that affect the vendor's product (such as, for example, vulnerabilities affecting Microsoft's INTERNET EXPLORER® illustrated in FIG. 6).

FIG. 18 illustrates some examples of banner grabbing. The CPE prediction service 30 may retrieve the banner data representing the web service banner 38. The banner 38 describes information about a remote/networked computer system 22a (illustrated as remote server 120) hosting the web service 40. The banner 38 provides many service and server/device details. The banner 38, for example, may identify a port, the computer software service(s) 40 (e.g., the vendor:product fields 70-72 illustrated in FIGS. 4-9), and a software version running on the remote/networked computer system 22a/server 120 (again as illustrated in FIGS. 4-9). The CPE prediction service 30 may use a banner grabbing operation 122 to acquire the banner 38. The CPE prediction service 30, for example, may use passive or active banner grabbing techniques that periodically or randomly send HTTP/HTTPS queries to some or all publicly-available IP addresses. The CPE prediction service 30 may additionally or alternatively send HTTP/HTTPS queries to private network IP addresses. The CPE prediction service 30 may then receive and analyze the banners 38 that are sent as HTTP/HTTPS responses. The banner 38, for example, may include textual data that reveals the vendor:product fields 70-72. The banner 38 may further specify more data, such as HTTP/HTTPS headers, HTML links or content, robots.txt, sitemap.xml, security.txt, favicons, screenshots, web technologies, redirect intermediate data, and hostname. Once the banner(s) 38 is/are acquired, the CPE prediction service 30 may then use the large language model 44 to predict the CPE products (as explained with reference to FIGS. 1-15).

The banners 38 may be regularly scanned. While the banner grabbing operation 122 may be performed according to any schedule or randomness, CPE prediction service 30 may conduct the banner grabbing operation 122 on a bi-weekly basis. The CPE prediction service 30 thus regularly scans IP addresses and exposes the corresponding web service 40.

FIG. 19 illustrates a more detailed example of the service architecture. The CPE prediction service 30 may use unsupervised or supervised artificial intelligence to predict the CPE data 34 across the computer software services 40 scanned by the banner grabbing operation 122 (as explained with reference to FIG. 18). The CPE prediction service 30 may pull the CPE data 34 from the vulnerability systems 110 (such as the National Vulnerability Database, the VULN-CHECK system, or other as illustrated by FIG. 16). The CPE prediction service 30 may additionally or alternatively pull the web service banners 38 (and their corresponding attributes 74 and other metadata) via the banner grabbing operation 122 (as explained with reference to FIG. 18). The CPE prediction service 30 may then acquire the banner sample 80 having the CPE data 34 labeled with its corresponding web service banners 38 and attributes 74.

FIG. 19, for example, illustrates examples using weak supervision. The large language model 44 may be recursively banner-prompted to predict the labeled CPE products (as explained with reference to FIGS. 4-15). In general, a supervised learning approach tends to perform better than an unsupervised learning approach. This is because supervised models are able to adjust themselves based on feedback they get from labels. The CPE prediction service 30 may thus use the large language model 44 (or LLM) to label the CPE products, as LLMs tend to do well at parsing unstructured data. The CPE prediction service 30 thus increases precision and coverage for CPEs and labels determined by the LLM 44. The CPE prediction service 30 thus tightens the significant CPE coverage gap that represents a long tale of niche products (as explained with reference to FIG. 2).

FIGS. 20-21 illustrate examples of supervised classification. Because the LLM 44 may excel at parsing unstructured data, the LLM 44 may first be banner-prompted using some or all of the banner sample 80. The CPE prediction service 30, for example, may use a publicly-available LLM 44 (such as CHATGPT®, LLAMA®, or CLAUDE®) as a first-pass prediction. The LLM 44 need not require pre-training or fine-tuning (i.e., a foundational model and prompting). If budgets and time permit, of course, the LLM 44 may be pre-trained and prompt engineered for even better/faster predictive performance. In step 1, for example (illustrated as reference numeral 130), the CPE prediction service 30 may randomly sample a group of the web services 40 (thus creating the banner sample 80). In step 2 (illustrated as reference numeral 132), the LLM 44 is banner-prompted using the banners/attributes 38/74 and asked to predict a list of the CPE products (such as explained with reference to FIG. 12). In step 3 (illustrated as reference numeral 134), the banner sample 80 is automatically filtered to those included in the list of LLM-predicted CPE products. In step 4 (illustrated as reference numeral 136), the LLM is re-prompted with the banners/attributes 38/74 and the filtered CPE products (e.g., the step 3 filtered banner sample 80) and asked to predict the second list 94 of CPE products (such as explained with reference to FIG. 13). In step 5 (illustrated as reference numeral 138), the prompting and filtering is repeated for all services in the banner sample 80, and the LLM labeling function 100 applied, thus returning a final labeled/curated list 140 of predicted CPEs for each web service 40 in the banner sample 80 (such as explained with reference to FIGS. 14-15).

FIG. 21 illustrates supervised classification. Once the final labeled/curated list 140 of predicted CPEs is generated, classification schemes may be applied. The final labeled/curated list 140 of predicted CPEs, for example, may be preprocessed (such as exploding the dataframe to have one (1) row per labeled instance). The CPE prediction application 56 may then instruct the server 26/50 to generate banner embeddings 150 for the text data representing the web service banners 38 and attributes 74. While other embedding schemes may be used, the proof-of-concept examples used term frequency-inverse document frequency (or TFIDF) measure an importance of each word in the text data representing the web service banners 38 and attributes 74. The CPE prediction application 56 may then train a supervised classifier 152 on the banner embeddings 150 and the labels specified by the final labeled/curated list 140 of predicted CPEs. Again, while other classification schemes may be used, the proof-of-concept examples used a nearest neighbor search (such as a fixed radius neighbor classifier) that defines a radius size for each point and predicts CPEs, in a voting manor, based on points in the training set that fall within the radius. Services that do not lie within the radius are not predicted. Once the supervised classifier 152 is so trained, the supervised classifier 152 may then be applied to remaining banners 38, attributes 74, and/or web services 40 collected using the banner-grabbing operation 122 (as explained with reference to FIG. 18).

FIGS. 22-23 illustrate examples of data transformations and feature engineering performed using the banner data representing the banner 38. The proof-of-concept pulled a random sample of 20,000 web services 40 running on HTTP/S. Some 61.3% of the web services 40 had at least one (1) CPE identified from YARA rules, spanning across 137 unique rules. The proof-of-concept was validated using this dataset because it offered some existing CPE labels. FIG. 22 thus illustrates the banner 38 as a software services table that may be generated by the CPE prediction service 30 as an electronic record of the banner grabbing operation 122 (as explained with reference to FIG. 18). The software services table records the textual service data representing the HTTP/HTTPS response (such as the IP address, the banner 38, and attributes/metadata). The CPE prediction application 56, for example, may instruct the server 26/50 to store the software services table to the local memory device 54 or some other networked location (all illustrated with reference to FIGS. 3-4). While FIG. 22 only illustrates a single response, in practice the banner 38 may reveal multiple computer software services 40 associated with the IP address and/or hostname (such as ['sonicwall:network_security_manager', 'sonicwall:universal_management_appliance', and 'sonicwall:viewpoint']). FIG. 23 illustrates examples of a text feature transformation that concatenates the textual service data representing the HTTP/HTTPS response(s) (e.g., the banner 38).

Figure 24:
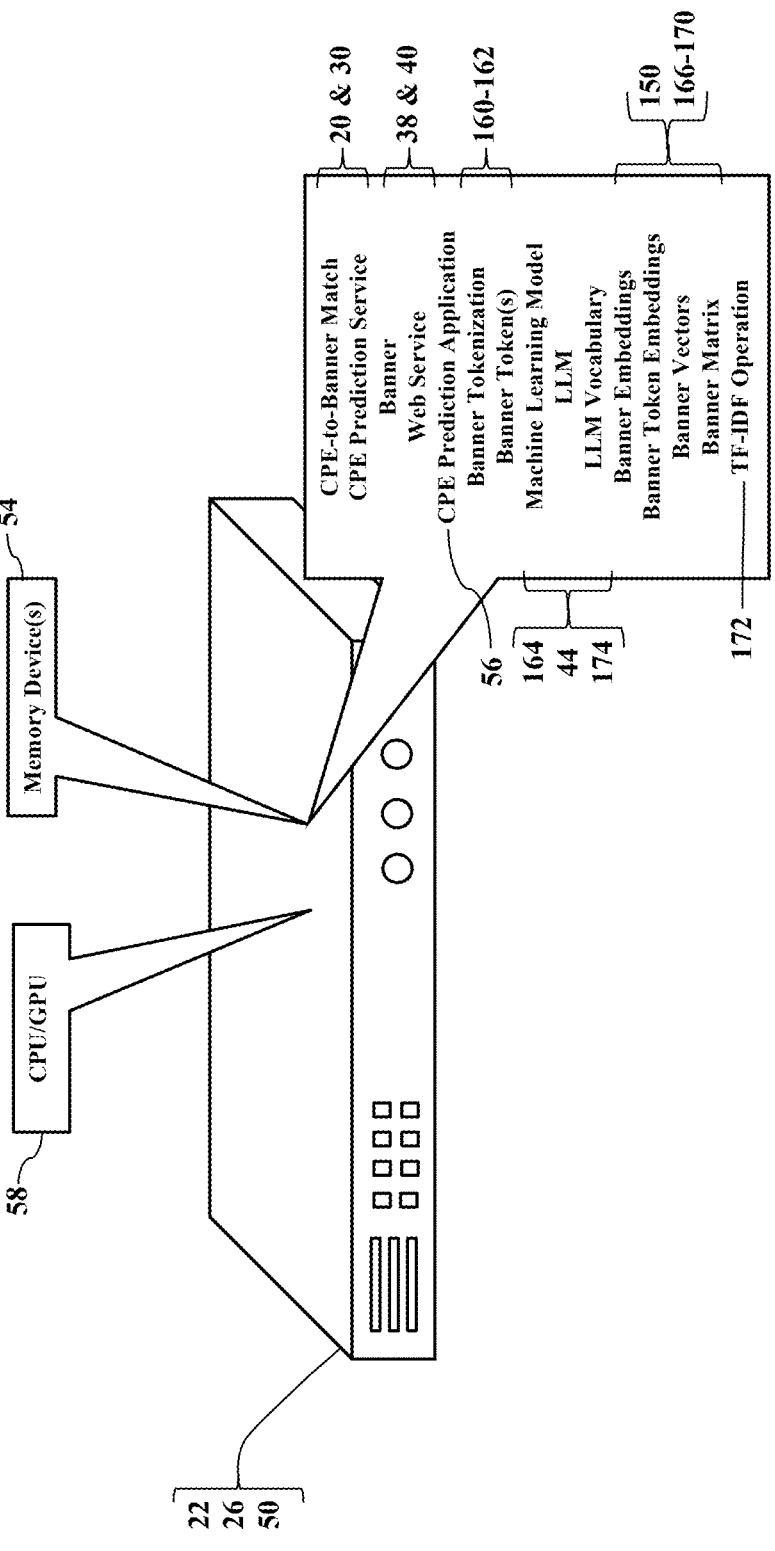

FIGS. 24-25 illustrate more examples of data transformations and feature engineering performed using the banner data representing the service banner 38. Both FIGS. 24 and 25, for example, illustrate the computer system 22 (such as the server 26/50) performing a banner tokenization operation 160. The banner tokenization operation 160 uses the concatenated textual service data representing the banner 38 (as illustrated in FIG. 23). The CPE prediction application 56 may instruct or cause the server 24 (again illustrated as the rack server 50) to perform operations, such as generating one or more banner tokens 162 that represent the concatenated textual service data representing the banner 38 (as FIG. 23 illustrates). The CPE prediction application 56 may thus tokenize the concatenated textual service data representing the banner 38. The banner tokens 162, for example, represent words, character sets, or combinations of words and punctuation contained within the concatenated textual service data representing the banner 38. A machine learning model 164 (perhaps such as the large language model 44 above discussed) may tokenize the banner 38 as textual training data and analyze patterns and semantic relationships between the banner tokens 162. After training, for example, the machine learning model 164 may use those patterns and relationships to generate a sequence of output tokens based on the inputted banner tokens 162. The CPE prediction application 56 may use a tokenization scheme or method, such as word tokenization, character tokenization, and subword tokenization, byte-pair encoding, and others as desired. The machine learning model 164 may assign a unique banner token identifier to each banner token 162. The machine learning model 164 may thus represent the banner 38 as a sequence of banner token identifiers. The machine learning model 164 may then generate banner token embeddings 166 (using the banner token identifiers) that represent the banner embeddings 150. The banner embeddings 150 represent semantic relationships between the banner tokens 162. Each banner token embedding 166 is assigned to a corresponding one of the banner tokens 162, based on how commonly the corresponding banner token 162 is used together with, or in similar contexts to, the other banner tokens 162. After the machine learning model 164 is trained, the machine learning model 164 may use the learned banner token embeddings 166 to iteratively generate an output. The CPE prediction service 30, as simple examples, may generate the banner tokens 162 that represent the vendor: product fields 70-72 (illustrated in FIGS. 4-11). As FIG. 25 best illustrates, the CPE prediction application 56 may instruct the server 26/50 to generate a banner matrix 168 representing the banner token embeddings 166 (and a banner vector 170) using the concatenated textual service data and the term frequency-inverse document frequency (or TF-IDF) operation (illustrated as reference numeral 172). The TF-IDF operation 172 thus determines the importance of a word in the concatenated textual service data representing the banner 38. The banner tokenization operation 160 may periodically re-fit (e.g., once per day) and transform with each batch of new web services 40. The CPE prediction service 30 (perhaps the machine learning model 164) may then compare the banner embeddings 150 (such as the tokens/embeddings/matrix/vectors 162/166/168/170) to the LLM tokens/embeddings/matrix/vectors representing the LLM's vocabulary 174.

The proof-of-concept demonstrates improved computer functioning. The proof-of-concept evaluated the large language model's efficacy on known YARA-labeled web services 40. The proof-of-concept sampled fifteen (15) web services 40 with existing YARA labels to evaluate efficacy on a small banner sample 80. The proof-of-concept then prompted the LLM 44 to predict CPEs for each of the fifteen (15) web services 40, returning an empty list if none were found. Precision is the main metric to optimize for, as accurate CPE predictions builds trust in users and customers. Although only the small fifteen (15) sample was evaluated, an initial precision of 79% was excellently obtained. That is, of fourteen (14) CPEs the LLM 44 predicted, eleven (11) were correct (11/14=79%). The false positives were isolated to only one (1) web service 40, with the rest of the web services' predictions being accurate. In this search, the LLM 44 also found two (2) novel, correctly predicted CPEs that the YARA rules did not cover (e.g., vercel:next.js and redmine:redmine). Out of the eighteen (18) YARA-labeled CPEs, the LLM 44 identified ten (10), exhibiting a 56% recall. This small analysis intuitively reveals that the computer system 22, by banner-prompting LLM 44, improves computer functioning by precisely predicting CPEs and by discovering novel CPEs beyond those of existing methods.

More computer functioning is improved. The banner-prompted LLM 44 was also used to predict CPEs of unknown services. Using the LLM labeling function 100, the LLM 44 was prompted to predict a random sample of fifteen (15) web services 40 that had zero existing YARA rule CPE coverage. The LLM 44 found six (6) CPE products across four (4) web services 40, many of which represented CPEs the YARA rules missed and one (1) of which represented a novel CPE the LLM 44 discovered (such as microsoft:frontpage), as below illustrated:

| text | cpe_preds |
|---|---|
| <html>\n<head>\n<link rel="stylesheet" type="t... | [microsoft:frontpage] |
| <!DOCTYPE html PUBLIC "-//W3C//DTD XHTML 1.0 T... | [ibm:http_server, php:php] |
| <!DOCTYPE html>\n<!--\n Licensed to the Apa... | [apache:http_server, php:php] |
| \n<!DOCTYPE html>\n<html dir="ltr">\n<head>\n ... | [cpanel:cpanel] |

The supervised classifier 152 was then trained on the LLM-generated labels. The RadiusNeighborsClassifier was again used for this proof-of-concept. This defines a radius size for each point and predicts CPEs, in a voting manor, based on points in the training set that fall within the radius. Web services 40, without training data, but within their radius, are predicted as unknown. The radius size is based on the distance metric used to measure distance between service text in the embedding space (as explained with reference to FIGS. 21-25). The proof-of-concept used cosine distance.

FIG. 26 illustrates more examples of improved computer functioning. After training the supervised classifier 152 using the LLM-labeled data (as illustrated and explained with reference to FIGS. 21-25), the RadiusNeighborsClassifier predicted on the whole 20,000 dataset. The supervised classifier 152 identified fourteen (4) instances of the novel microsoft:frontpage CPE, along with 7,931 instances of CPEs missed by YARA rules. This included 115 cpanel: cpanel CPEs that were missed by YARA rules despite having strong regex-validated indicators of that CPE. In using the RadiusNeighborsClassifier with a small radius size and a voting mechanism that weeds out noisy labels, this limited the false positives since it only predicts CPEs with web service banners 38 and attributes 74 that are very similar to that seen in the training set and labeled by the LLM 44. As a result, no obvious FPs were spotted in the predictions. In only using fifteen (15) datapoints in training, the proof-of-concept was able to cover 7% of web services 40 with zero (0) YARA rule CPE coverage. This represents an increase of coverage for all web services 40 of 3%, increasing coverage from 61% to 64%. Even trained on such a small dataset, the proof-of-concept was able to demonstrate promise in closing the coverage gap. Simply put, by banner-prompting the LLM 44 to predict and label CPE products, and by training the supervised classifier 152 using the LLM-labeled data, the server 26 is programmed to predict that the CPE data 34 is the true positive match 88 with the web service 40. Because the CPE data 34 is associated with the web service 40, the CPE prediction application 56 may further determine that the corresponding common vulnerabilities and exposures (or CVE) data 36 also matches the web service 40 (as explained with reference to FIGS. 16-17). The CVE data 36, in other words, describes the known cybersecurity vulnerabilities, exposures, and other cyberthreats associated with the web service 40.

FIG. 27 illustrates examples of cybersecurity notifications. Once the CPE products (e.g., the CPE data 34) are predicted and the CVE data 36 is determined, the CPE prediction service 30 may initiate cybersecurity remedial actions. Once the CPE/CVE data 34/36 is/are matched to the web service 40, the CPE prediction service 30 may implement operations that resolve the known cybersecurity vulnerabilities, exposures, and other cyberthreats associated with the web service 40. The CPE prediction service 30, for example, may cause the server 26 to generate and to send a CVE notification 190 to a network address (e.g., IP address) associated with the web service 40. FIG. 27, for simplicity, illustrates the CVE notification 190 routing to the remote server 22a/120 providing the web service 40. When the web service 40 and/or the remote server 22a/120 receives the CVE notification 190, the web service 40 and/or the remote server 22a/120 may be programmed to read the CVE notification 190 and to obtain the CVE data 36 describing the known cybersecurity vulnerabilities, exposures, and other cyberthreats associated with the web service 40. As a simple example, the CVE notification 190 may have electronic content identifying the vendor:product data fields 70-72 obtained from the predicted CPE data 34. The CVE notification 190 may further have electronic content identifying cybersecurity vulnerabilities, exposures, and other CVE data 36 associated with the vendor:product data fields 70-72. Simply put, the CVE notification 190 alerts the web service 40 that some portion of its software programming/ services are out-of-date and/or otherwise vulnerable to cybersecurity threats. The web service 40 and/or the remote server 22a/120 may thus initiate software updates, patches, and other remedial operations that resolve the cyberthreats. The CPE prediction service 30 may thus alert web services 40 and servers 22a/120 to the CVE data 36 that improves computer functioning.

The CPE prediction service 30 thus again improves computer functioning. As users, customers, and organizations scale their networks, their product/computer exposure becomes increasingly difficult to monitor. Unknown, Internet-facing exposed assets leave severe blind spots for IT management. Most of these assets go unrecognized, and software products/services are riddled with unpatched, vulnerable programming. Threat actors are often motivated to take advantage of these vulnerable assets. The CPE prediction service 30, though, allows users, customers, and organizations to understand which CPEs are running on which assets. The CPE prediction service 30 reveals blind spots, from understanding CVE exposure to identifying products affected by Zero-Day vulnerabilities. Some conventional, rules-based schemes identify popular/prominent products, but it's impractical to implement rules for a wide variety of products and services. Indeed, many older/niche products are equally as prominent, revealing a long-tail where a substantial number of services are still represented by a large volume of less popular products. Due to the sheer volume of unique products in the wild, it's impractical to cover all products using rules-based methods.

The CPE prediction service 30, however, automatically monitors product exposure using the elegant banner-prompted LLM 44. The CPE prediction service 30 uses the banner-prompted LLM 44 to accurately predict and label CPE products. The CPE prediction service 30 then trains the supervised classifier 152 using the LLM-labeled data. The CPE prediction service 30 represents a weakly supervised AI/ML framework that learns from the web service 40 and the CPE data 34. The CPE prediction service 30 maps natural language into vector space representations, and the CPE prediction service 30 discovers CPEs by comparing the banner word embeddings. The CPE prediction service 30 may fit the TF-IDF operation 150 to the service banners 38 and banner attributes of each web service 40 using the CPE vocabulary. The CPE prediction service 30 may thus implement the TF-IDF operation 150 to determine a text/word relevancy in the service banners 38. The CPE prediction service 30 may oversample more important areas (such as the vendor/product data fields explained with reference to FIGS. 4-11). The CPE prediction service 30 thus automatically identifies and matches CPEs across web services 40 scanned through external surface methods (such as publicly facing Internet ports). The CPE prediction service 30 pulls the CPE data 34 from any central vulnerabilities database (such as the vulnerability system 110) as well as the service banners 38 and attributes 74 from the external surface scans. The banners 38 and attributes 74 refer to text banners from banner grabbing and HTML responses from HTTP/S requests (such as the banner grabbing operation 130). The CPE prediction service 30 thus represents a weakly supervised AI/ML framework of identifying CPEs for given web services 40.

Computer functioning is further improved. The CPE prediction service 30 incorporates machine learning to match CPEs based on word embedding radial measures between CPEs and internet scans. The CPE prediction service 30 maps scan responses to vector space, learns from the underlying data distributions, and predicts vulnerable computers to solve a known security challenge. The CPE prediction service 30, in particular, provides a CPE identification framework which works at scale and matches a substantial number of CPEs, perhaps even all, that requires little, if any, manual manpower. The CPE prediction service 30 uses passive scanning to identify more CPEs than active scanning in a less intrusive and much quicker manner. The CPE prediction service 30 uses embeddings (e.g., the banner token embeddings 166) to understand word tokens within the global and local context of web service scans. The CPE prediction service 30 not only uses the service banners 38, but the CPE prediction service 30 may also harvest and use HTML response banners. The CPE prediction service 30 uses the banner 38 as an entirely new data source to find CPE matches both within banners and HTML responses.

Computer functioning is further improved. The CPE prediction service 30 matches the CPE data 34 to the web service 40 using greatly reduced hardware (e.g., processor and memory) and network resources. By predicting matches between the CPE data 34 and the web service 40, the CPE prediction service 30 uses less processor cycles and memory bytes than conventional rules-based schemes. Moreover, by more accurately predicting matches the CPE data 34 to the web service 40, cybersecurity threats are more quickly determined and more quickly resolved/patched. Simply put, substantial computer resources may be reduced and reallocated, and substantial electrical power is concomitantly conserved.

FIG. 28 illustrates examples of methods or operations that predicts the common platform enumeration (CPE) product. The computer system 22 banner grabs the web service banner 38 (Block 200). The computer system 22 predicts the CPE product by banner prompting the large language model 44 (LLM) using the web service banner 38 (Block 202).

FIG. 29 illustrates more examples of methods or operations that predict the common platform enumeration (CPE) product. The computer system 22 banner grabs the web service banner 38 (Block 210). The computer system 22 predicts the CPE product by recursively banner prompting the large language model 44 (LLM) using the web service banner 38 (Block 212).

FIG. 30 illustrates more examples of methods or operations that predict common platform enumeration (CPE) products. The web service banners 38 are banner grabbed (Block 220). The banner sample 80 is generated by sampling the web service banners 38 (Block 222). The CPE products are predicted by banner prompting the large language model 44 (LLM) using the banner sample 80 (Block 224).

FIG. 31 illustrates a more detailed example of the operating environment. FIG. 31 is a more detailed block diagram illustrating the computer system 22. The cybersecurity CPE prediction application 56 is stored in the memory subsystem or device 54. One or more of the hardware processors 58 communicate with the memory subsystem or device 54 and execute the cybersecurity CPE prediction application 56. Examples of the memory subsystem or device 54 may include Dual In-Line Memory Modules (DIMMs), Dynamic Random Access Memory (DRAM) DIMMs, Static Random Access Memory (SRAM) DIMMs, non-volatile DIMMs (NV-DIMMs), storage class memory devices, Read-Only Memory (ROM) devices, compact disks, solid-state, and any other read/write memory technology.

The computer system 22 may have any embodiment. This disclosure mostly discusses the computer system 22 as the server 26 and the remote server 120. The CPE prediction service 30, however, may be easily adapted to mobile computing, wherein the computer system 22 may be a smartphone, laptop or desktop computer, a switch/router, a tablet computer, or a smartwatch. The CPE prediction service 30 may also be easily adapted to other embodiments of smart devices, such as a television, an audio device, a remote control, and a recorder. The CPE prediction service 30 may also be easily adapted to still more smart appliances, such as washers, dryers, and refrigerators. Indeed, as cars, trucks, and other vehicles grow in electronic usage and in processing power, the CPE prediction service 30 may be easily incorporated into any vehicular controller.

The above examples of the CPE prediction service 30 may be applied regardless of communications networking technology and networking environment. The CPE prediction service 30 may be easily adapted to stationary or mobile devices having wide-area networking (e.g., 4G/LTE/5G/6G cellular), wireless local area networking (WI-FI®), near field, and/or BLUETOOTH® capability. The CPE prediction service 30 may be applied to stationary or mobile devices utilizing any portion of the electromagnetic spectrum and any signaling standard (such as the IEEE 802 family of standards, GSM/CDMA/TDMA or any cellular standard, and/or the ISM band). The CPE prediction service 30, however, may be applied to any processor-controlled device operating in the radio-frequency domain and/or the Internet Protocol (IP) domain. The CPE prediction service 30 may be applied to any processor-controlled device utilizing a distributed computing network, such as the Internet (sometimes alternatively known as the "World Wide Web"), an intranet, a local-area network (LAN), and/or a wide-area network (WAN). The CPE prediction service 30 may be applied to any processor-controlled device utilizing power line technologies, in which signals are communicated via electrical wiring. Indeed, the many examples may be applied regardless of physical componentry, physical configuration, or communications standard(s).

Operating environments may utilize any processing component, configuration, or system. For example, the CPE prediction service 30 may be easily adapted to execute by a desktop, mobile, or server central/graphical processing unit 58 or chipset offered by INTEL®, ADVANCED MICRO DEVICES®, ARM®, NVIDIA®, APPLE®, TAIWAN SEMICONDUCTOR MANUFACTURING®, QUAL-COMM®, or other manufacturer. The computer system 22 may even use multiple central CPUs/GPUs/cores or chipsets, which could include distributed processors or parallel processors in a single machine or multiple machines. The CPUs/GPUs/cores or chipsets can be used in supporting a virtual processing environment. The CPUs/GPUs/cores or chipsets could include a state machine or logic controller. When any of the CPUs/GPUs/cores or chipsets execute instructions to perform "operations," this could include the CPUs/GPUs/cores or chipsets performing the operations directly and/or facilitating, directing, or cooperating with another device or component to perform the operations.

The CPE prediction service 30 may use packetized communications. When the computer system 22 and the cloud computing environment 24 communicate, information may be collected, sent, and retrieved. The information may be formatted or generated as packets of data according to a packet protocol (such as the Internet Protocol). The packets of data contain bytes of data describing the contents, or payload, of a message. A header of each packet of data may be read or inspected and contain routing information identifying an origination address and/or a destination address.

The CPE prediction service 30 may utilize any signaling standard. The cloud computing environment 24 may mostly use wired networks to interconnect the network members 28. However, the cloud computing environment 24 may utilize any communications device using the Global System for Mobile (GSM) communications signaling standard, the Time Division Multiple Access (TDMA) signaling standard, the Code Division Multiple Access (CDMA) signaling standard, the "dual-mode" GSM-ANSI Interoperability Team (GAIT) signaling standard, or any variant of the GSM/CDMA/TDMA signaling standard. The cloud computing environment 24 may also utilize other standards, such as the I.E.E.E. 802 family of standards, the Industrial, Scientific, and Medical band of the electromagnetic spectrum, BLUETOOTH®, low-power or near-field, and any other standard or value.

The CPE prediction service 30 may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for predicting the CPE products by banner-prompting the LLM 44, as the above paragraphs explain.

The diagrams, schematics, illustrations, and tables represent conceptual views or processes illustrating examples of CPE predicting by banner-prompting the LLM 44. The functions of the various elements shown in the figures may be provided through the use of dedicated hardware as well as hardware capable of executing instructions. The hardware, processes, methods, and/or operating systems described herein are for illustrative purposes and, thus, are not intended to be limited to any particular named manufacturer or service provider.

As used herein, the singular forms "a," "an," and "the" are intended to include the plural forms as well, unless expressly stated otherwise. It will be further understood that the terms "includes," "comprises," "including," and/or "comprising," when used in this Specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, and so on, may be used herein to describe various elements, these elements should not be limited by these terms. These terms are only used to distinguish one element from another. For example, a first computer or container could be termed a second computer or container and, similarly, a second device could be termed a first device without departing from the teachings of the disclosure.

The invention claimed is:

1. A method executed by a computer system that predicts a common platform enumeration (CPE) product, comprising:
   banner-grabbing a web service banner;
   predicting the CPE product by banner-prompting a large language model (LLM) trained using semantic relationships learned from web service banners; and
   classifying the CPE product by a classifier trained using the web service banners.

2. The method of claim 1, further comprising training the LLM using the web service banners.

3. The method of claim 1, further comprising training the LLM using a CPE data.

4. The method of claim 1, wherein the banner-prompting further comprises using a banner attribute associated with the web service banner.

5. The method of claim 1, further comprising recursively performing the banner-prompting of the LLM.

6. The method of claim 1, further comprising filtering a CPE data using the CPE product.

7. The method of claim 1, further comprising determining a vendor associated with the CPE product.

8. At least one computer system that predicts a common platform enumeration (CPE) product, comprising:
   at least one central processing unit; and at least one memory device storing instructions that, when executed by the at least one central processing unit, perform operations, the operations comprising:

banner-grabbing a web service banner;

predicting the CPE product by banner-prompting a large language model (LLM) trained using semantic relationships learned from web service banners; and classifying the CPE product by a classifier trained using the web service banners.

9. The at least one computer system of claim 8, wherein the operations further comprise labeling the CPE product by prompting the LLM as a labeling function.

10. The at least one computer system of claim 8, wherein the operations further comprise generating a concatenated web service banner by concatenating the web service banners.

11. The at least one computer system of claim 10, wherein the operations further comprise generating banner tokens representing the web service banners using a machine learning model trained with the semantic relationships learned from the web service banners.

12. The at least one computer system of claim 11, wherein the operations further comprise generating a banner embedding using a machine learning model trained with the semantic relationships learned from the web service banners.

13. The at least one computer system of claim 11, wherein the operations further comprise banner-grabbing the web service banners from the Internet.

14. The at least one computer system of claim 8, wherein the operations further comprise training the LLM using a CPE data.

15. The at least one computer system of claim 8, wherein the operations further comprise determining a vendor associated with the CPE product.

16. A non-transitory memory device storing instructions that, when executed by at least one central processing unit, perform operations that predict common platform enumeration (CPE) products, the operations comprising:

banner-grabbing web service banners;

generating a banner sample by sampling the web service banners;

predicting first CPE products by banner-prompting a large language model (LLM) trained using the web service banners;

generating filtered CPE products by filtering the banner sample according to the first CPE products predicted by the banner-prompting of the LLM trained using the web service banners;

generating a final CPE prediction of the CPE products by re-prompting the LLM using the banner sample and the filtered CPE products generated by the filtering of the banner sample; and classifying the web service banners by a classifier trained using the CPE products.

17. The non-transitory memory device of claim 16, wherein the operations further comprise generating a concatenated web service banner by concatenating the web service banners.

18. The non-transitory memory device of claim 17, wherein the operations further comprise generating banner tokens representing the web service banners by tokenizing the concatenated web service banner.

19. The non-transitory memory device of claim 18, wherein the operations further comprise generating a banner token embedding representing the banner tokens.

20. The non-transitory memory device of claim 19, wherein the operations further comprise determining a vendor associated with the CPE products.

* * * * *